(12) United States Patent
Hussain

(10) Patent No.: US 12,272,874 B2
(45) Date of Patent: Apr. 8, 2025

(54) SUB-GHZ CIRCULARLY POLARIZED UWB MIMO ANTENNA

(71) Applicant: KING FAHD UNIVERSITY OF PETROLEUM AND MINERALS, Dhahran (SA)

(72) Inventor: Rifaqat Hussain, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 190 days.

(21) Appl. No.: 18/314,449

(22) Filed: May 9, 2023

(65) Prior Publication Data
US 2024/0380115 A1 Nov. 14, 2024

(51) Int. Cl.
| | |
|---|---|
| H01Q 13/10 | (2006.01) |
| H01Q 1/28 | (2006.01) |
| H01Q 13/02 | (2006.01) |
| H01Q 21/06 | (2006.01) |
| H01Q 21/24 | (2006.01) |
| H04B 7/0413 | (2017.01) |

(52) U.S. Cl.
CPC ........... *H01Q 13/106* (2013.01); *H01Q 1/288* (2013.01); *H01Q 13/0241* (2013.01); *H01Q 21/24* (2013.01); *H04B 7/0413* (2013.01)

(58) Field of Classification Search
CPC ...... H01Q 1/523; H01Q 13/10; H01Q 17/001; H01Q 21/005; H01Q 21/06
See application file for complete search history.

(56) References Cited

U.S. PATENT DOCUMENTS

| | | | |
|---|---|---|---|
| 11,450,968 B1* | 9/2022 | Hussain | ................ H01Q 21/28 |
| 2017/0012362 A1* | 1/2017 | Murch | ................ H01Q 13/106 |
| 2019/0379135 A1 | 12/2019 | Sharawi | |

OTHER PUBLICATIONS

Hussain et al. ; Miniaturized frequency reconfigurable pentagonal MIMO slot antenna for interweave CR applications ; International Journal of RF and Microwave Computer-Aided Engineering ; Feb. 9, 2023 ; 20 Pages.
Hussain et al. ; 4-Element Concentric Pentagonal Slot-Line-Based Ultra-Wide Tuning Frequency Reconfigurable MIMO Antenna System ; IEEE Transactions on Antennas and Propagation, vol. 66, Issue: 8 ; May 23, 20118 ; 3 Pages ; Abstract Only.

(Continued)

*Primary Examiner* — Hoang V Nguyen
(74) *Attorney, Agent, or Firm* — Oblon, McClelland, Maier & Neustadt, L.L.P.

(57) ABSTRACT

A dual port, slot-based multiple-input-multiple-output (MIMO) antenna is described. The antenna includes a dielectric circuit board, a metallic layer, four tapered feed horns and adjustable voltage sources. A first pentagonal loop slot line and a second pentagonal loop slot line are etched into the metallic layer. The tapered feed horns are located on an opposite side of the dielectric circuit board and are connected to input signal sources. Adjustable voltage sources are connected to varactor diodes of the first and seconds pentagonal loop slot line. The antenna resonates with circular polarization at resonant frequency in an ultra-high frequency sub-GHz range of about 578 MHz to about 929 MHz when an input signal is applied to each feedline. A dual port, slot-based single element antenna is also described.

20 Claims, 9 Drawing Sheets

(56) References Cited

OTHER PUBLICATIONS

Wang et al. ; New Circular-Slot Circularly Polarized Antenna with Modified Characteristic ; International Jounral of Antennas and Propagation, vol. 2022 ; Apr. 22, 2022 ; 8 Pages.
Pandian et al. ; A New UWB Tri-Band Antenna for Cognitive Radio ; Procedia Technology 6 ; 2012 ; 8 Pages.
Sung ; Dual-Band Circularly Polarized Pentagonal Slot Antenna ; IEEE Antennas and Wireless Propagation Letters, vol. 10 ; Apr. 5, 2011 ; 3 Pages ; Abstract Only.
Reddy et al. ; Dual polarized pentagon slot based antenna for tri band applications ; 2015 Annual IEEE India Conference (INDICON) ; Dec. 17-20, 2015 ; 3 Pages ; Abstract Only.

* cited by examiner

SUB-GHZ CIRCULARLY POLARIZED UWB MIMO ANTENNA

BACKGROUND

Technical Field

The present disclosure is directed to a sub-GHZ circularly polarized ultra-wideband (UWB) MIMO antenna.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Satellite communication systems play an increasingly important role in modern communication systems. Satellite communication has many advantages, such as wide coverage, large communication capacity, high transmission quality, and rapid networking. Recent developments have led to smaller, lightweight, and simplified satellite systems, such as pico-class satellites or cube satellites (CubeSats). After deployment, the vital function of the CubeSats is to establish and maintain communications with one or more ground or orbital locations. to perform various communication functions, a CubeSat includes one or more transceiver antennas. The CubeSat has more stringent limitations on antenna design due to size constraints, usually less than 1000 $cm^3$. Compact size requirements of CubeSat antennas pose several challenges in complying with standards set for CubeSat.

A circularly polarized antenna (CPA) offers many advantages over a linearly polarized antenna (LPA), such as decreased polarization mismatching losses, and the ability to provide freedom of antenna orientation. Therefore, the CPA is a desirable choice for satellite applications, WiMax, WLAN, RFID tags, and 5G applications. Slit-slot and microstrip patch-based antennas offer bidirectional circular polarization (CP) radiation.

A polarization-agile antenna has been described that is configured to change polarization state dynamically, i.e., the antenna can have either linear polarization (vertical or horizontal) or circular polarization (left hand or right hand), depending on the requirements of its specific application. (See: S. Gao, A. Sambell, and S. S. Zhong, "Polarization-agile antennas," IEEE Antennas Propag. Mag., vol. 48, no. 3, pp. 28-37, June 2006, incorporated herein by reference in its entirety). However, dynamic modifications to frequency and radiation properties of the polarization-agile antenna may not be easy or possible without significant design changes. Due to an increasing demand for CubeSats in many different fields, a reconfigurable antenna is required in the CubeSat to ease the burden of manufacturing an antenna for each specific use. The reconfigurable antenna can modify its frequency and radiation properties dynamically in a controlled and reversible manner. The polarization direction of the antenna can be reconfigured between right-hand circular polarization (RHCP) and left-hand circular polarization (LHCP) by either rotating a metasurface or using an electrical reconfiguration with P-I-N diodes or varactor diodes. In an existing polarization reconfigurable E-shaped patch antenna, a single-layer single-feed E-shaped patch and two radio frequency (RF) switches are used in the antenna slots to change the polarization state. The polarization reconfig-urable E-shaped patch antenna exhibits a 7% effective bandwidth from 2.4 GHz to 2.57 GHz with an 8.7 dB maximum gain. (See: A. Khidre, K.-F. Lee, F. Yang, and A. Z. Elsherbeni, "Circular polarization reconfigurable wideband E-shaped patch antenna for wireless applications," IEEE Transactions on Antennas and Propagation, vol. 61, no. 2, pp. 960-964, 2013, incorporated herein by reference in its entirety). Another circular polarization reconfigurable loop antenna was described that used two PIN diodes. By controlling the on/off states of the PIN diodes, the polarization of the antenna can be switched electronically to RHCP or LHCP over a wide-band frequency range (2.4 GHz-2.8 GHz) [See: L. Zhang, S. Gao, Q. Luo, P. R. Young, and Q. Li, "Wide-band loop antenna with electronically switchable circular polarization," IEEE Antennas and Wireless Propagation Letters, vol. 16, pp. 242-245, 2017, incorporated herein by reference in its entirety.]. In another polarization reconfigurable antenna, eight diodes were used for loading on the feeding network for linear polarization (LP)/LHCP/RHCP reconfigurability [See: L.-Y. Ji, P.-Y. Qin, Y. J. Guo, C. Ding, G. Fu, and S.-X. Gong, "A wide-band polarization reconfigurable antenna with partially reflective surface," IEEE Transactions on Antennas and Propagation, vol. 64, no. 10, pp. 4534-4538, 2016, incorporated herein by reference in its entirety.] The antenna provides 3 dB axial-ratio bandwidth of 4.68-5.33 GHZ (13%). However, each of these antennas radiate at greater than 2.4 GHz, rather than in a sub-GHz band. Further, these conventional antennas require additional complex biasing circuitry to control the switching, which increases the cost and reduces the antenna efficiency and circularly polarized bandwidth.

The demand for sub-GHz antennas (the sub-GHz technology operates in a frequency band less than 1 GHz, usually less than or equal to 920 MHz) for wireless applications have increased rapidly due to long-range communication ability and low power consumption. A circularly polarized antenna with the features of frequency-polarization reconfigurability with wide-band and compact size characteristics is challenging to design for the sub-GHz spectrum. Although many circularly polarized antennas have been presented in the sub-GHz band for RFID tags, the internet of things, and several other applications, but they do not offer frequency and polarization reconfigurability. Additionally, multiple-input-multiple-output (MIMO) configurations are essential for high data rates with seamless connectivity. None of the aforementioned circularly polarized antennas with reconfigurability has MIMO capabilities and are able to operate in sub-GHz frequency band.

Hence, there is a need for a circularly polarized MIMO antenna that has a compact size, wide operating bandwidth in the sub-GHz frequency band, polarization bandwidth reconfigurability, and good diversity performance.

SUMMARY

In an exemplary embodiment, a dual port, slot-based multiple-input-multiple-output (MIMO) antenna for cubic shaped satellites (CubeSat) is described. The MIMO antenna includes a dielectric circuit board, a metallic layer, a first pentagonal loop slot line, a second pentagonal loop slot line, a first tapered feed horn, a second tapered feed horn, a third tapered feed horn, a fourth tapered feed horn, a first adjustable voltage source, and a second adjustable voltage source. The dielectric circuit board has a surface dimension of about 100 mm in length and about 100 mm in width, a top side, a bottom side, a first edge opposite a second edge, a third edge opposite a fourth edge, a first central axis extending from the first edge to the second edge, and a second central axis extending from the third edge to the fourth edge. The metallic layer is configured to cover the top side of the dielectric circuit board. The first pentagonal loop slot line and the second pentagonal loop slot line are etched into the metallic layer on the top side of the dielectric circuit board. The second pentagonal loop slot line is a mirror image of the first pentagonal loop slot line across the second central axis. Each pentagonal loop slot line is configured to have an apex coincident with the first central axis, a first leg having a first end at the apex, wherein the first leg extends from the apex towards the third edge at a first angle, a second leg having a first end connected to the first leg at the apex, wherein the second leg extends from the apex towards the fourth edge at an angle equal to a negative of the first angle, a third leg having a first end connected to a second end of the first leg, wherein the third leg extends parallel to the third edge and towards the second central axis, a fourth leg having a first end connected to a second end of the second leg, wherein the fourth leg extends parallel to the fourth edge and towards the second central axis, a fifth leg which extends between a second end of the third leg and a second end of the fourth leg, the fifth leg configured with a gap, wherein the gap is bisected by the central axis; and a varactor diode connected across the gap to the metallic layer on either side of the gap. The first tapered feed horn is located on the bottom side. The first tapered feed horn is connected to a first feedline which extends from the third edge towards the first central axis. An opening of the first tapered feed horn extends towards the gap in the fifth leg of the first pentagonal loop slot line. The second tapered feed horn is located on the bottom side. The second tapered feed horn is connected to a second feedline which extends from the fourth edge towards the first central axis. An opening of the second tapered feed horn extends towards the gap in the fifth leg of the first pentagonal loop slot line. The third tapered feed horn is located on the bottom side. The third tapered feed horn is connected to a third feedline which extends from the third edge towards the first central axis. An opening of the third tapered feed horn extends towards the gap in the fifth leg of the second pentagonal loop slot line. The fourth tapered feed horn is located on bottom side. The fourth tapered feed horn is connected to a fourth feedline which extends from the fourth edge towards the first central axis. An opening of the fourth tapered feed horn extends towards the gap in the fifth leg of the second pentagonal loop slot line. The first adjustable voltage source is connected to the varactor diode of the first pentagonal loop slot line. A change in a voltage of the first adjustable voltage source is configured to tune a resonant frequency of the first pentagonal loop slot line of the dual port, slot-based MIMO antenna. The second adjustable voltage source is connected to the varactor diode of the second pentagonal loop slot line. A change in a voltage of the second adjustable voltage source is configured to tune a resonant frequency of the second pentagonal loop slot line of the dual port, slot-based MIMO antenna. The dual port, slot-based MIMO antenna is configured to resonate with circular polarization at a resonant frequency in an ultra-high frequency sub-GHz range of about 578 MHz to about 929 MHz when an input signal is applied to each feedline.

In another exemplary embodiment, a method for transmitting ultra-high frequency (UHF) signals with a dual port, slot-based multiple-input-multiple-output (MIMO) antenna is described. The method includes connecting an input signal to a plurality of feedlines located on the dual port, slot-based MIMO antenna. The dual port, slot-based MIMO antenna includes a dielectric circuit board, a metallic layer, a first pentagonal loop slot line, a second pentagonal loop slot line, a first tapered feed horn, a second tapered feed horn, a third tapered feed horn, a fourth tapered feed horn, a first adjustable voltage source, and a second adjustable voltage source. The dielectric circuit board has a surface dimension of about 100 mm in length and about 100 mm in width, a top side, a bottom side, a first edge opposite a second edge, a third edge opposite a fourth edge, a first central axis extending from the first edge to the second edge, and a second central axis extending from the third edge to the fourth edge. The metallic layer is configured to cover the top side of the dielectric circuit board. The first pentagonal loop slot line and the second pentagonal loop slot line are etched into the metallic layer on the top side of the dielectric circuit board. The second pentagonal loop slot line is a mirror image of the first pentagonal loop slot line across the second central axis. Each pentagonal loop slot line is configured to have: an apex coincident with the first central axis; a first leg having a first end at the apex, wherein the first leg extends from the apex towards the third edge at a first angle; a second leg having a first end connected to the first leg at the apex, wherein the second leg extends from the apex towards the fourth edge at an angle equal to a negative of the first angle; a third leg having a first end connected to a second end of the first leg, wherein the third leg extends parallel to the third edge and towards the second central axis; a fourth leg having a first end connected to a second end of the second leg, wherein the fourth leg extends parallel to the fourth edge and towards the second central axis; a fifth leg which extends between a second end of the third leg and a second end of the fourth leg, the fifth leg configured with a gap, wherein the gap is bisected by the central axis; and a varactor diode connected across the gap to the metallic layer on either side of the gap. The first tapered feed horn is located on the bottom side. The first tapered feed horn is connected to a first feedline of the plurality of feedlines. The first feedline extends from the third edge towards the first central axis. An opening of the first tapered feed horn extends towards the gap in the fifth leg of the first pentagonal loop slot line. The second tapered feed horn is located on the bottom side. The second tapered feed horn is connected to a second feedline of the plurality of feedlines. The second feedline extends from the fourth edge towards the first central axis. An opening of the second tapered feed horn extends towards the gap in the fifth leg of the first pentagonal loop slot line. The third tapered feed horn located on the bottom side. The third tapered feed horn is connected to a third feedline of the plurality of feedlines. The third feedline extends from the third edge towards the first central axis. An opening of the third tapered feed horn extends towards the gap in the fifth leg of the second pentagonal loop slot line. The fourth tapered feed horn located on bottom side, wherein the fourth tapered feed horn is connected to a fourth feedline of the plurality of feedlines. The fourth feedline extends from the fourth edge towards the first central axis. An opening of the fourth tapered feed horn extends towards the gap in the fifth leg of the second pentagonal loop slot line. The first adjustable voltage source is connected to the varactor diode of the first pentagonal loop slot line. The second adjustable voltage source connected to the varactor diode of the second pentagonal loop slot line. The method includes adjusting a voltage of the first adjustable voltage source to tune a resonant frequency of the first pentagonal loop slot line of the dual feed single element antenna. The method includes adjusting a voltage of the second adjustable voltage source to tune a resonant frequency of the second pentagonal loop slot line of the dual feed single element antenna. The method includes biasing, with a biasing circuit, the varactor diode to cause the dual port, MIMO antenna to transmit the input signal with circular polarization at a resonant frequency in an ultra-high frequency sub-GHz range of about 578 MHz to about 929 MHz.

In another exemplary embodiment, a dual port, slot-based single element antenna for cubic shaped satellites (CubeSat) is described. The antenna incudes The dual port, slot-based MIMO single element antenna includes a dielectric circuit board, a metallic layer, a pentagonal loop slot line, a first tapered feed horn, a second tapered feed horn, a third tapered feed horn, a fourth tapered feed horn, a first adjustable voltage source, and a second adjustable voltage source. The dielectric circuit board has a surface dimension of about 100 mm in length and about 100 mm in width, a top side, a bottom side, a first edge opposite a second edge, a third edge opposite a fourth edge, and a central axis extending from the first edge to the second edge. The metallic layer is configured to cover the top side of the dielectric circuit board. The pentagonal loop slot line etched into the metallic layer on the top side of the dielectric circuit board, the pentagonal loop configured to have: an apex near the first edge and coincident with the central axis; a first leg having a first end at the apex, wherein the first leg extends from the apex towards the third edge at a first angle; a second leg having a first end connected to the first leg at the apex, wherein the second leg extends from the apex towards the fourth edge at an angle equal to a negative of the first angle; a third leg having a first end connected to a second end of the first leg, wherein the third leg extends parallel to the third edge and towards the second edge; a fourth leg having a first end connected to a second end of the second leg, wherein the fourth leg extends parallel to the fourth edge and towards the second edge; a fifth leg which extends between a second end of the third leg and a second end of the fourth leg, the fifth leg configured with a gap, wherein the gap is bisected by the central axis; and a varactor diode connected across the gap to the metallic layer on either side of the gap. The first tapered feed horn located on the bottom side, wherein the first tapered feed horn is connected to a first feedline which extends from the third edge towards the first central axis, wherein an opening of the first tapered feed horn extends towards the gap in the fifth leg. The second tapered feed horn located on the bottom side, wherein the second tapered feed horn is connected to a second feedline which extends from the fourth edge towards the first central axis, wherein an opening of the second tapered feed horn extends towards the gap in the fifth leg. The adjustable voltage source connected to the varactor diode, wherein a change in a voltage of the adjustable voltage source is configured to tune a resonant frequency of the dual feed single element antenna to resonate with circular polarization at a resonant frequency in an ultra-high frequency sub-GHz range of about 578 MHz to about 929 MHz when an input signal is applied to each feed horn.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
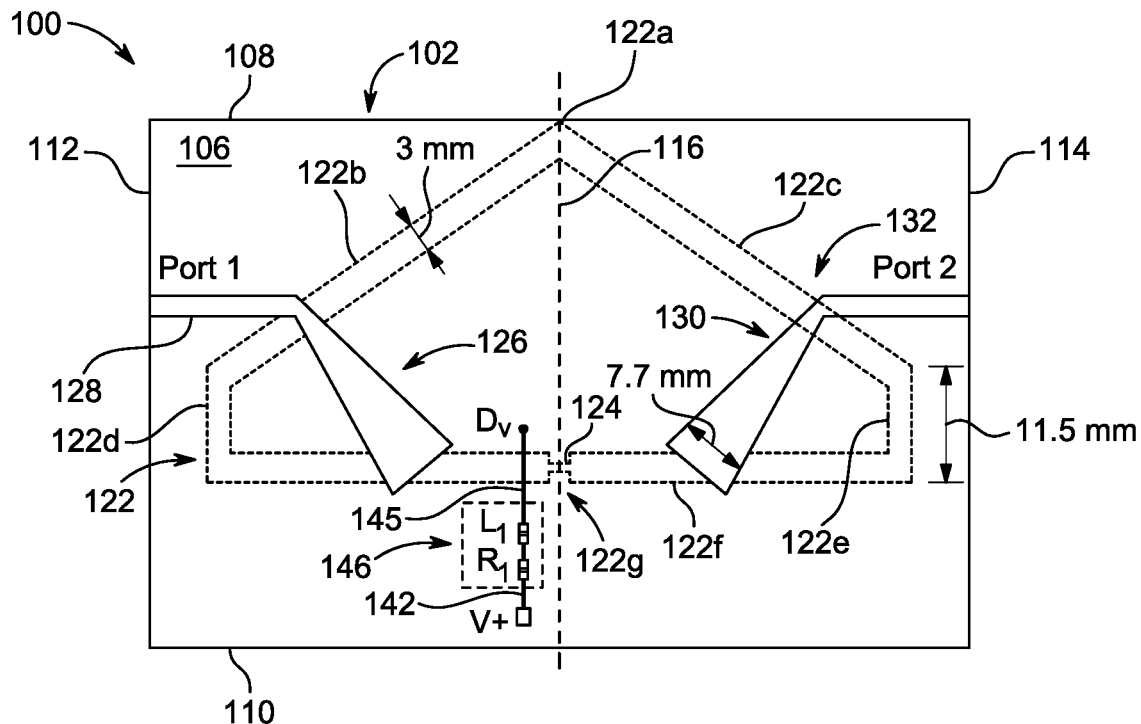
FIG. 1A is a bottom view of a dual port, slot-based single element antenna, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a dual-port, slot-based multiple-input-multiple-output (MIMO) antenna (hereinafter interchangeably referred to as "the MIMO antenna"). The MIMO antenna is a compact, planar, circularly polarized sub-GHz slot-based MIMO antenna. The MIMO antenna includes a pentagonal reactively loaded slot, fed by two folded tapered feedlines, to achieve circular polarization (CP). The MIMO antenna resonates with a left hand circular polarization (LHCP) when a left port is excited, and a right hand circular polarization (RHCP) when a right port is excited. The MIMO antenna responds with a linear polarization (LP) when both ports (the left port and the right port) are excited simultaneously. The MIMO antenna is a frequency-reconfigurable circularly polarized antenna (CPA). A resonance of the MIMO antenna may be reconfigured based on end-user demands by varying the capacitance value of the varactor diode. The MIMO antenna exhibits wide-band operation, covering a frequency band from 578 MHz to 929 MHz. The MIMO antenna has an axial ratio (AR) bandwidth ranging from 490 MHz to 810 MHz, which can be tuned over the −10 dB operating bandwidth (578 MHz to 929 MHz). Moreover, two elements are placed on a dielectric substrate with 100 mm×100 mm×0.76 mm dimensions to realize pattern diversity in the output signal. The key characteristics of the MIMO antenna are compact size, wide operating bandwidth in the sub-GHz band, dual sense with polarization bandwidth reconfigurability, and good diversity performance, making it a potential candidate for several applications. The MIMO antenna is highly suitable for utilization in small satellites, especially for CubeSat applications.

Figure 1B:
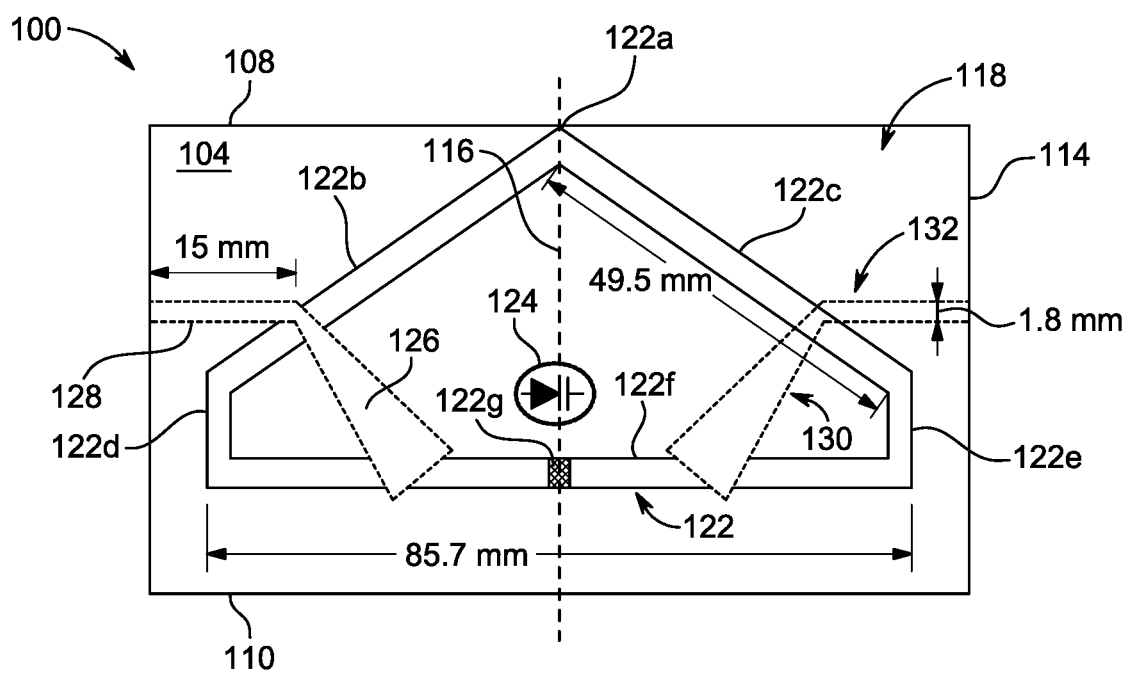
FIG. 1B is a top view of the single element antenna, according to certain embodiments.

An aspect of the present disclosure describes a dual port, slot-based, single element antenna, as shown in FIG. 1A to FIG. 1B. The single element antenna is representative of either one of the dual antennas of the dual port, slot-based MIMO antenna of FIG. 2B to FIG. 2D.

In various aspects of the disclosure, definitions of one or more terms that will be used in the document are provided below.

The term "decibel (or dB)" is a unit used to measure a ratio of input to a reference power. The dB measures the intensity of the power level of an electrical signal by comparing it to a given scale. For example, an amplifier causes a gain in power measured in decibels and it is indicated by a positive number. In another example, cables can cause a loss of power. This is measured in negative dB.

The term "axial ratio (AR)" of an antenna is defined as a ratio between a major axis and a minor axis of a radiation pattern of a circularly polarized antenna. If an antenna has perfect circular polarization, then AR would be 1 (0 dB). However, if the antenna has an elliptical polarization, then AR would be greater than 1 (>0 dB).

The term "frequency reconfigurable antenna" is defined as an antenna which can alter its frequency of operation dynamically.

The term "pattern diversity" refers to two or more co-located antennas with different radiation patterns. This type of diversity makes use of directional antennas that are usually physically separated by some (often short) distance. Collectively they are capable of discriminating a large portion of angle space and can provide a higher gain versus a single omnidirectional radiator.

FIG. 1A-FIG. 1B illustrate an overall configuration of a dual port, slot-based single element antenna 100 for cubic shaped satellites (CubeSat). FIG. 1A may be read in conjunction with FIG. 2B-FIG. 2D for a better understanding. In the drawings of FIG. 1A-FIG. 2D, dimensions shown are for the example of a 100×100 mm² circuit board and should not be construed as limiting. For a circuit board less than 100×100 mm², the dimensions are proportionately smaller. Similarly, for a circuit board greater than 100×100 mm², the dimensions are proportionately larger.

FIG. 1A illustrates a bottom view (back view or back side) of the dual port, slot-based single element antenna 100 (hereinafter interchangeably referred to as "the single element antenna 100"). FIG. 1B is a top view (front view or front side) of the single element antenna 100.

The single element antenna 100 includes a dielectric circuit board 102, a metallic layer 118, a pentagonal loop slot line 122, a first tapered feed horn 126, a second tapered feed horn 130, and a varactor diode 124 inserted in a gap 122g of the pentagonal loop slot line 122.

The dielectric circuit board 102 has a surface dimension of about 100 mm in length and about 100 mm in width. The dielectric circuit board 102 has a top side 104, a bottom side 106, a first edge 108, a second edge 110, a third edge 112, a fourth edge 114, and a central axis 116. The first edge 108 is opposite to the second edge 110. The third edge 112 is opposite to the fourth edge 114. The central axis 116 extends from the first edge 108 to the second edge 110. In an example, the dielectric circuit board 102 is a flame retardant (FR)-4 lossy dielectric plate. FR-4 (or FR4) is a glass-reinforced epoxy laminate material. FR-4 is a composite material composed of woven fiberglass cloth with an epoxy resin binder that is flame-resistant (self-extinguishing). In an example, a thin layer of copper foil is typically laminated to one or both sides of the FR-4 lossy dielectric plate. In an example, the FR-4 substrate has a thickness of 0.76 mm.

FIG. 1A shows the bottom side 106 of the dielectric circuit board 102. The pentagonal loop slot line 122 is shown as a dotted line to indicate its location on the top side 104 with respect to the first tapered feed horn 126 and the second tapered feed horn 130.

FIG. 1B shows the metallic layer 118 which is configured to cover the top side 104 of the dielectric circuit board 102. In an example, the metallic layer 118 is copper.

As shown in FIG. 1B, the pentagonal loop slot line 122 is etched into the metallic layer 118 on the top side 104 of the dielectric circuit board 102. For example, the pentagonal loop slot line 122 is etched on the metallic layer 118 using a printed circuit board (PCB) laser etching and milling machine (for example, LPKF Prototyping machine manufactured by LPKF Laser & Electronics, located at Osteriede 7, 30827 Garbsen, Germany).

As shown in FIG. 1B, the pentagonal loop slot line 122 includes an apex 122a, a plurality of connected legs (122b-122f), and the varactor diode 124. The plurality of connected legs (122b-122f) includes five legs having a first leg 122b, a second leg 122c, a third leg 122d, a fourth leg 122e, and a fifth leg 122f. The apex 122a is located near the first edge 108 and is coincident with the central axis 116.

The first leg 122b has a first end and a second end. The first end is located at the apex 122a. The first leg 122b extends from the apex 122a towards the third edge 112 at a first angle.

The second leg 122c has a first end and a second end. The first end of the second leg 122c is connected to the first leg at the apex 122a. The second leg 122c extends from the apex 122a towards the fourth edge 114 at an angle equal to a negative of the first angle.

The third leg 122d has a first end and a second end. The first end is connected to the second end of the first leg 122b. The third leg 122d extends in parallel to the third edge 112 and towards the second edge 110.

The fourth leg 122e has a first end, and a second end. The first end is connected to the second end of the second leg 122c. The fourth leg 122e extends in parallel to the fourth edge 114 and towards the second edge 110.

The fifth leg 122f extends between the second end of the third leg 122d and the second end of the fourth leg 122e. The fifth leg 122f is configured with a gap 122g. The gap 122g is bisected by the central axis 116.

The varactor diode 124 is connected across the gap 122g to the metallic layer 118 on either side of the gap 122g. In an example, the varactor diode 124 has a capacitance value in the range of about 0.3 picoFarads to about 1.08 picoFarads. In an example, the varactor diode 124 is a SMV2019 varactor diode (fabricated by Skyworks Solutions, Inc., located at 5260 California Ave, Irvine, CA 92617, USA).

The first tapered feed horn 126 (port 1) is located on the bottom side 106. The first tapered feed horn 126 is connected to a first feedline 128. The first feedline 128 extends from the third edge 112 towards the central axis 116. An opening (wider end) of the first tapered feed horn 126 extends towards the gap 122g in the fifth leg 122f.

The second tapered feed horn 130 (port 2) is located on the bottom side 106 of the dielectric circuit board 102. The second tapered feed horn 130 is connected to a second feedline 132. The second feedline 132 extends from the fourth edge 114 towards the central axis 116. An opening of the second tapered feed horn 130 extends towards the gap 122g in the fifth leg 122f.

An adjustable voltage source V+142 is connected to the varactor diode 124. A change in a voltage of the adjustable voltage source is configured to tune a resonant frequency of the single element antenna 100 to resonate with circular polarization (CP) in an ultra-high frequency sub-GHz range of about 578 MHz to about 929 MHz when an input signal is applied to each feed horn (the first tapered feed horn 126, and the second tapered feed horn 130).

A biasing circuit 145 is located on the bottom side 106 of the dielectric circuit board 102. The biasing circuit is connected by a shorting post between the adjustable voltage source 142 and the varactor diode 124. The biasing circuit includes a resistor $R_1$ in series with an inductor $L_1$.

The pentagonal loop slot line 122 is configured to resonate with left hand circular polarization (LHCP) when an input signal is applied to the first feedline 128. The pentagonal loop slot line 122 is configured to resonate with right hand circular polarization (RHCP) when an input signal is applied to the second feedline 132. The first tapered feed horn 126, the second tapered feed horn 130, and the pentagonal loop slot line 122 function as a single antenna element in combination. When the input signal is applied to both the first feedline 128 and the second feedline 132 simultaneously, the single element antenna is configured to resonate with circular polarization. The single antenna element may be configured to operate as a transmitting antenna or as a receiving antenna.

In another aspect of the present disclosure, a dual-port, slot-based MIMO antenna which is a polarization bandwidth-reconfigurable (LP, RHCP, and LHCP) is described. An axial ratio (AR) bandwidth of the antenna can be tuned from 578 MHz to 929 MHz by employing the varactor diode. For the MIMO configuration, a mirror image duplicate of the single antenna element of antenna 100 was formed on a lower half of the top side of the dielectric circuit board in a 180 degree rotational position from the position of the single antenna element around a second axis 217 while keeping all other parameters of the antenna fixed, as shown in FIG. 2A-FIG. 2D. Both of the antenna elements (the single antenna element, and the mirror image of the single antenna element) are closely spaced within the dielectric circuit board 102 to achieve desired MIMO performance metrics. To validate the design configuration of the MIMO antenna, a prototype of the MIMO antenna was fabricated and tested. The prototype is shown in FIG. 2C-FIG. 2D. The varactor diode was soldered and connected with the built-in circuitry of the dielectric circuit board (no additional circuit board is needed) for tuning the axial ratio (AR) bandwidth. The MIMO antenna offers good isolation within a compact size and stable radiation patterns. The present disclosure is configured to provide an antenna that has a compact size (100 mm×100 mm×0.76 mm), polarization bandwidth reconfigurability, and MIMO characteristics in one antenna module at the sub-GHz band.

FIG. 2A-FIG. 2D illustrate an overall configuration of a dual port, slot-based multiple-input-multiple-output (MIMO) antenna for CubeSat.

Figures 2A, 2B:
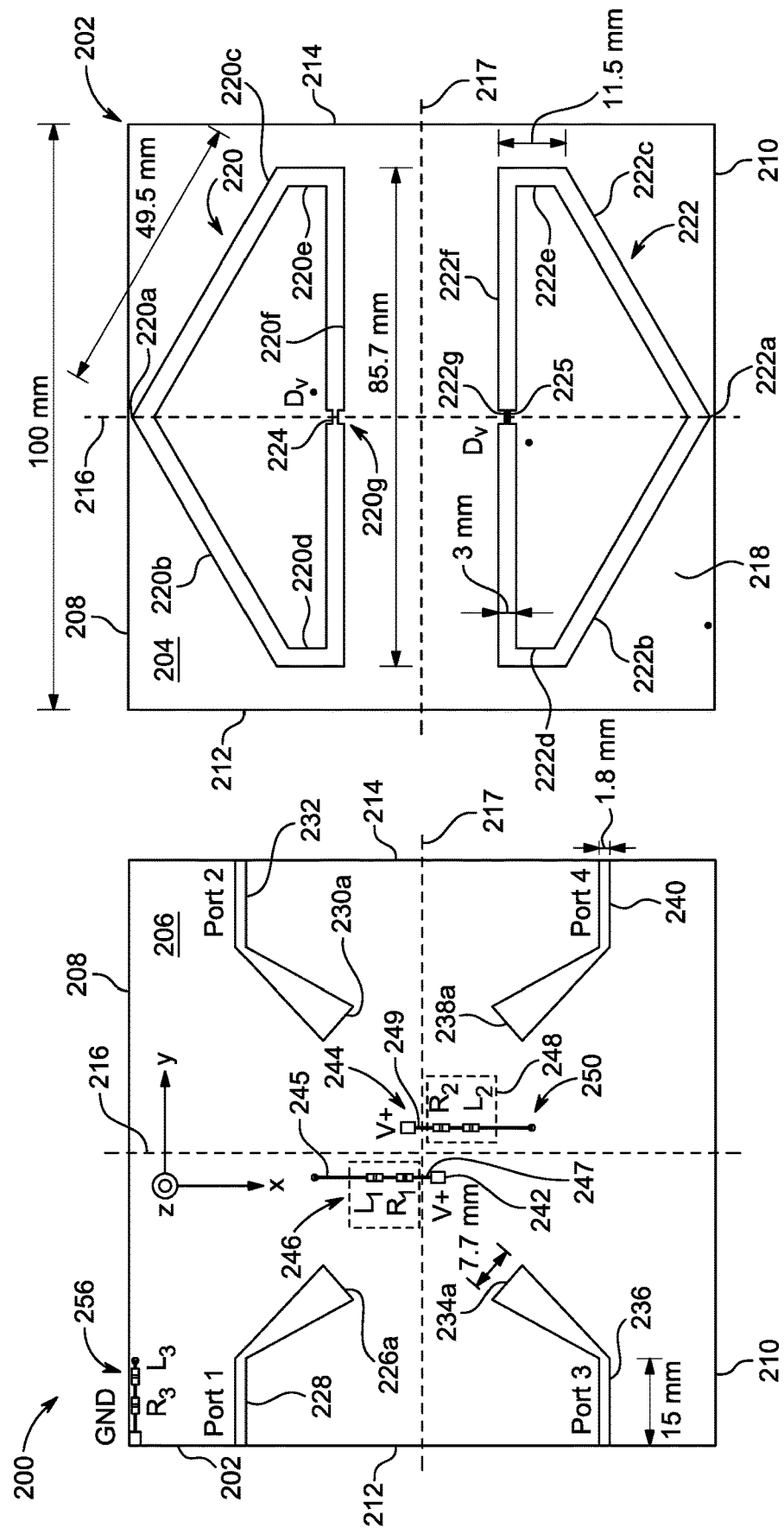
FIG. 2A is a bottom view of a dual port, slot-based multiple-input-multiple-output (MIMO) antenna ("MIMO antenna"), according to certain embodiments.
FIG. 2B is a top view of the dual port, slot-based MIMO antenna, according to certain embodiments.
Figure 2C:
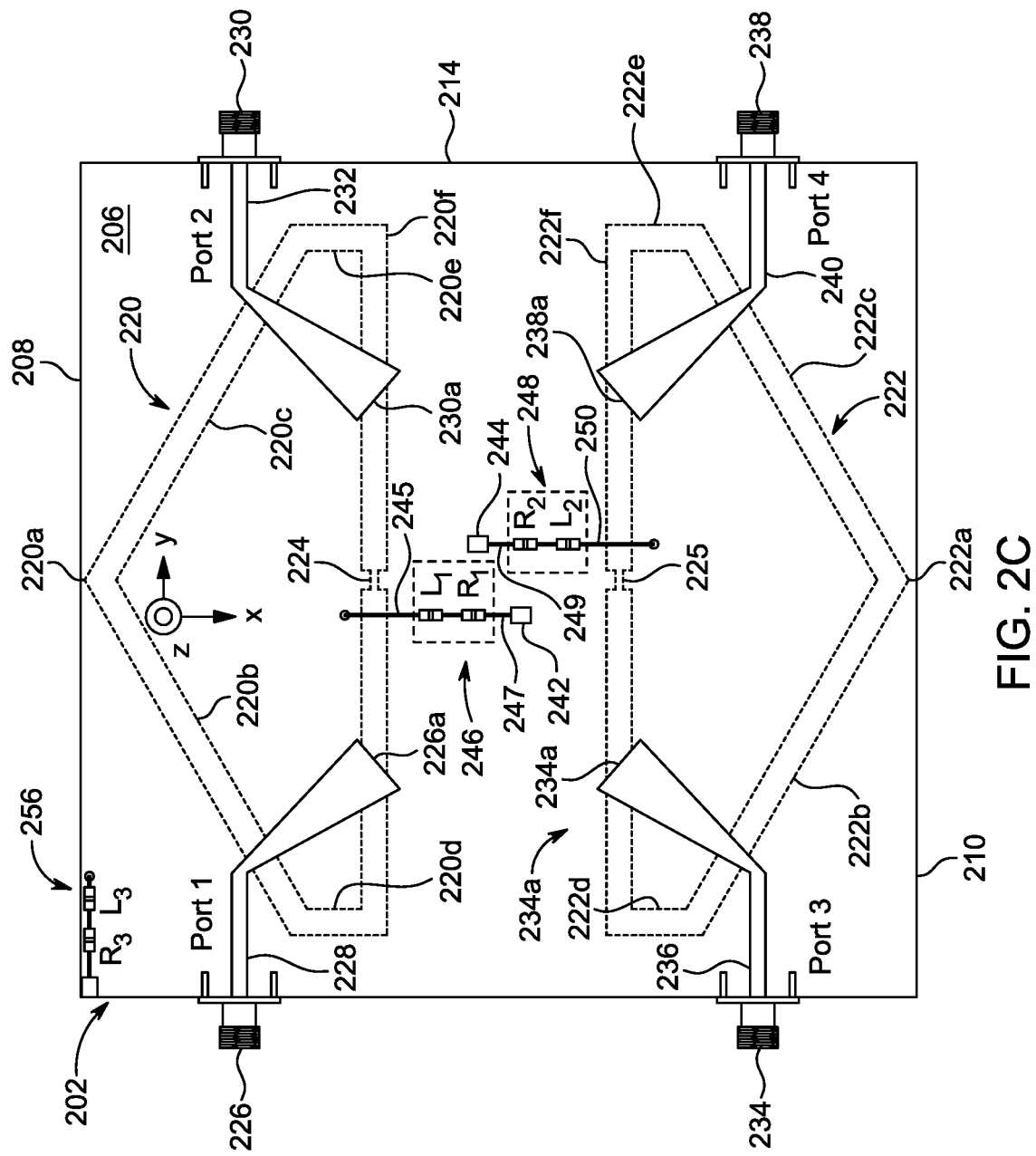
FIG. 2C is a bottom view of a fabricated dual port, slot-based MIMO antenna, according to certain embodiments.
Figure 2D:
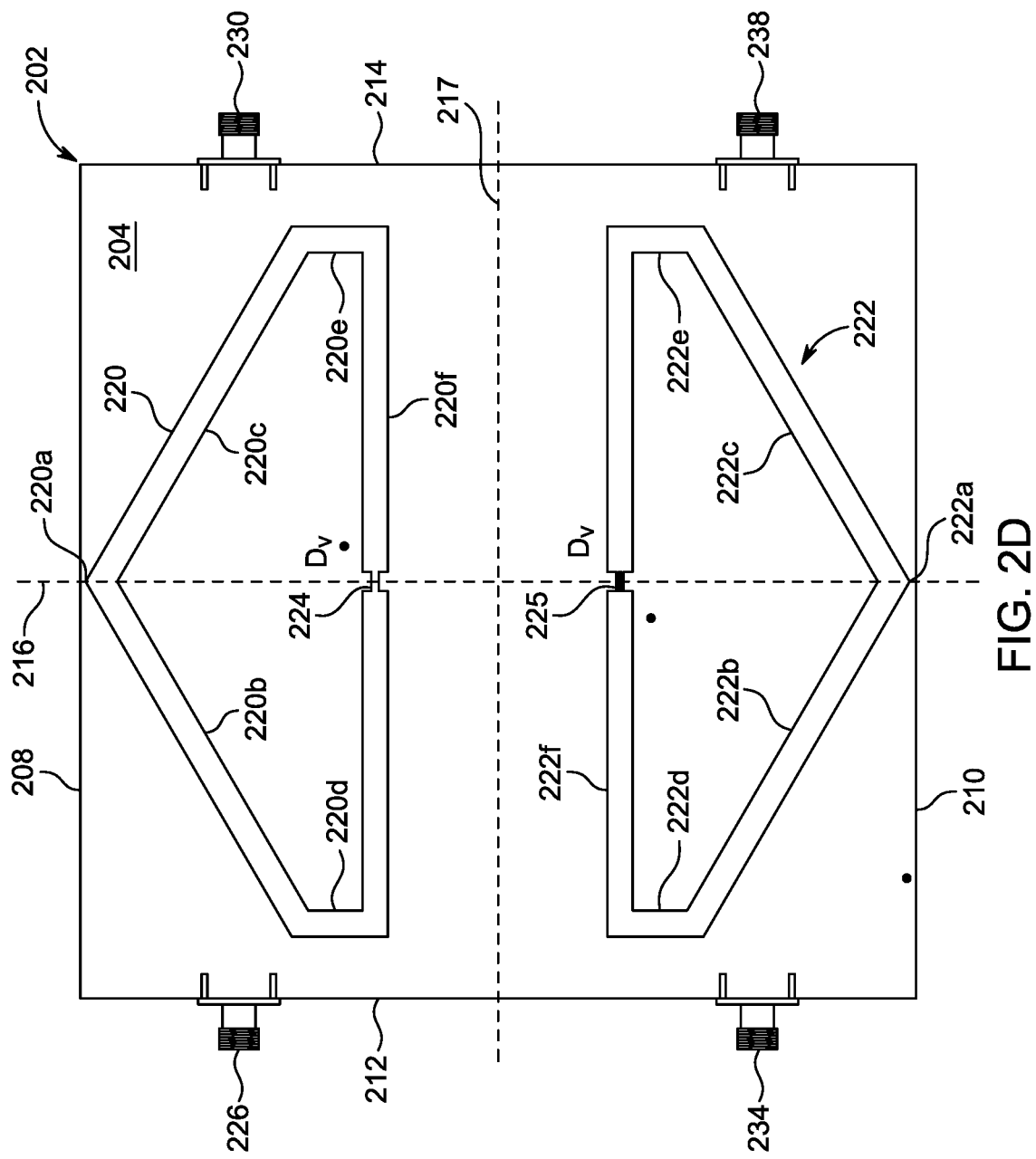
FIG. 2D is a top view of the fabricated dual port, slot-based MIMO antenna, according to certain embodiments.

FIG. 2A and FIG. 2C illustrate a bottom view (back view or back side) of the dual port, slot-based MIMO antenna (hereinafter interchangeably referred to as "the MIMO antenna 200"). FIG. 2B is a top view (front view or front side) of the MIMO antenna 200.

The MIMO antenna 200 includes a dielectric circuit board 202, a metallic layer 218, a first pentagonal loop slot line 220, a second pentagonal loop slot line 222, a first tapered feed horn 226, a second tapered feed horn 230, a third tapered feed horn 234, a fourth tapered feed horn 238, a first adjustable voltage source 242, and a second adjustable voltage source 244.

The dielectric circuit board 202 has a surface dimension of about 100 mm in length and about 100 mm in width. The dielectric circuit board 202 has a top side 204, a bottom side 206, a first edge 208, a second edge 210, a third edge 212, a fourth edge 214, a first central axis 216 and a second central axis 217. The first edge 208 is opposite to the second edge 210. The third edge 212 is opposite to the fourth edge 214. The first central axis 216 extends from the first edge 208 to the second edge 210 and bisects the dielectric circuit board 202 between the first edge 208 and the second edge 210. The second central axis 217 extends from the third edge 212 to the fourth edge 214 and bisects the dielectric circuit board 202 between the third edge 212 and the fourth edge 214. In an example, the dielectric circuit board 202 is a flame retardant (FR)-4 lossy dielectric substrate. In an example, the FR-4 substrate has a thickness of about 0.76 mm.

The metallic layer 218 is configured to cover the top side 204 of the dielectric circuit board 202. In an example, the metallic layer 218 is copper. The metallic layer 218 is grounded by connecting the metallic layer 218 to a first end of a third metallic shorting post 256, shown in FIG. 2C. The third metallic shorting post 256 is configured to extend from the bottom side 206 of the dielectric circuit board 202 to the top side 204. A third resistor $R_3$ is located on the bottom side 206. The third resistor $R_3$ is connected in series with a second end of the third metallic shorting post 256. A third inductor $L_3$ is connected in series with the third resistor $R_3$. The third inductor $L_3$ is connected to a ground terminal GND, as shown in FIG. 2A.

The first pentagonal loop slot line 220 and the second pentagonal loop slot line 222 are etched into the metallic layer 218 on the top side 204 of the dielectric circuit board 202. The second pentagonal loop slot line 222 is a mirror image of the first pentagonal loop slot line 220 across the second central axis 217. In an example, the first pentagonal loop slot line 220 and the second pentagonal loop slot line 222 are etched on the metallic layer 218 using the printed circuit board (PCB) laser etching and milling machine.

As shown in FIG. 2B, the first pentagonal loop slot line 220 includes an apex 220a, a plurality of connected legs (220b-220f), and a first varactor diode 224. The plurality of connected legs (220b-220f) includes five legs having a first leg 220b, a second leg 220c, a third leg 220d, a fourth leg 220e, and a fifth leg 220f. The apex 220a is located near the first edge 208 and is coincident with the first central axis 216.

The first leg 220b has a first end and a second end. The first end is located at the apex. The first leg 220b extends from the apex towards the third edge 212 at a first angle (with the first central axis 216) having a magnitude about 60 degrees.

The second leg 220c has a first end, and a second end. The first end is connected to the first leg 220b at the apex. The second leg 220c extends from the apex towards the fourth edge 214 at a second angle with the central axis equal to a negative of the first angle, or about minus 60 degrees. In an example, a length of the first leg 220b, and the second leg 220c is 49.5 mm. The angle between the first leg 220b and the second leg 220c is about 120 degrees.

The third leg 220d has a first end, and a second end. The first end of the third leg 220d is connected to the second end of the first leg 220b at an angle of about 30 degrees with respect to the second central axis 217. The third leg 220d extends parallel to the third edge 212 and towards the second central axis 217.

The fourth leg 220e has a first end, and a second end. The first end of the fourth leg 220e is connected to the second end of the second leg 220c at an angle of about minus 30 degrees with respect to the second central axis 217. The fourth leg 220e extends parallel to the fourth edge 214 and towards the second central axis 217. In an example, a length of the third leg 220d, and the fourth leg 220e is 11.5 mm.

The fifth leg 220f extends between the second end of the third leg 220d and the second end of the fourth leg 220e. The fifth leg 220f is configured with a gap 220g. The gap 220g is bisected by the first central axis 216. In an example, a length of the fifth leg 220f is 85.7 mm.

The first varactor diode 224 is connected across the gap 220g to the metallic layer 218 on either side of the gap 220g. In an example, the first varactor diode 224 has a capacitance value in the range of about 0.3 picoFarads to about 1.08 picoFarads.

As shown in FIG. 2B, the second pentagonal loop slot line 222 is a mirror image of the first pentagonal loop slot line 220. The second pentagonal loop slot line 222 includes an apex 222a, a plurality of connected legs (222b-222f), and a second varactor diode 225. The plurality of connected legs (222b-222f) includes five legs having a first leg 222b, a second leg 222c, a third leg 222d, a fourth leg 222e, and a fifth leg 222f. The apex 222a is located near the first edge 208 and is coincident with the first central axis 216.

The first leg 222b has a first end and a second end. The first end is located at the apex 222a. The first leg 222b extends from the apex towards the third edge 212 making an angle with the first central axis 216 of about 60 degrees.

The second leg 222c has a first end, and a second end. The first end is connected to the first leg at the apex 222a. The second leg 222c extends from the apex towards the fourth edge 214 at an angle equal to a negative of the first angle. In an example, a length of the first leg 222b, and the second leg 222c is 49.5 mm.

The third leg 222d has a first end, and a second end. The first end of the third leg 222d is connected to the second end of the first leg 222b. The third leg 222d extends parallel to the third edge 212 and towards the second central axis 217.

The fourth leg 222e has a first end, and a second end. The first end of the fourth leg 222e is connected to the second end of the second leg 222c. The fourth leg 222e extends parallel to the fourth edge 214 and towards the second central axis 217. In an example, a length of the third leg 222d, and the fourth leg 222e is 11.5 mm.

The fifth leg 222f extends between the second end of the third leg and the second end of the fourth leg 222e. The fifth leg 222f is configured with a gap 222g. The gap 222g is bisected by the first central axis 216. In an example, a length of the fifth leg 222f is 85.7 mm.

The second varactor diode 225 is connected across the gap 222g to the metallic layer 218 on either side of the gap 222g. In an example, the second varactor diode 225 has a capacitance value in the range of about 0.3 picoFarads to about 1.08 picoFarads.

The fifth leg 220f of the first pentagonal loop slot line 220 and the fifth leg 222f of the second pentagonal loop slot line 222 are separated along the first central axis 216 by a separation distance. The separation distance is configured to isolate the first pentagonal loop slot line 220 from the second pentagonal loop slot line 222. In an example, the separation distance is about 25 mm.

Each slot line (the slot lines of the first pentagonal loop slot line 220 and the second pentagonal loop slot line 222) has a constant width. For example, the constant width is about 2 mm.

The first tapered feed horn 226 is located on the bottom side 206 of the dielectric circuit board 202. The first tapered feed horn 226 is connected to a first feedline 228 which extends from the third edge 212 towards the first central axis 216. An opening 226a of the first tapered feed horn 226 extends towards the gap 220g in the fifth leg 220f of the first pentagonal loop slot line 220.

The second tapered feed horn 230 is located on the bottom side 206 of the dielectric circuit board 202. The second tapered feed horn 230 is connected to a second feedline 232 which extends from the fourth edge 214 towards the first central axis 216. An opening 230a of the second tapered feed horn 230 extends towards the gap 220g in the fifth leg 220f of the first pentagonal loop slot line 220.

The third tapered feed horn 234 is located on the bottom side 206 of the dielectric circuit board 202. The third tapered feed horn 234 is connected to a third feedline 236 which extends from the third edge 212 towards the first central axis 216. An opening 234a of the third tapered feed horn 234 extends towards the gap 222g in the fifth leg 222f of the second pentagonal loop slot line 222.

The fourth tapered feed horn 238 is located on bottom side 206 of the dielectric circuit board 202. The fourth tapered feed horn 238 is connected to a fourth feedline 240 which extends from the fourth edge 214 towards the first central axis 216. An opening 238a of the fourth tapered feed horn 238 extends towards the gap 222g in the fifth leg 222f of the second pentagonal loop slot line 222.

The first pentagonal loop slot line 220 is configured to resonate with LHCP when an input signal is applied to the second feedline 232. In another aspect, the first pentagonal loop slot line 220 is configured to resonate with RHCP when the input signal is applied to the second feedline 232.

The second pentagonal loop slot line 222 is configured to resonate with LHCP when an input signal is applied to the third feedline 236. In another aspect, the second pentagonal loop slot line 222 is configured to resonate with RHCP when the input signal is applied to the fourth feedline 240.

The MIMO antenna 200 is configured to resonate with circular polarization (CP) at a resonant frequency in an ultra-high frequency sub-GHz range of about 578 MHz to about 929 MHz when an input signal is applied to each feedline (the first feedline 228, the second feedline 232, the third feedline 236, and the fourth feedline 240).

Each tapered feed horn (the first tapered feed horn 226, the second tapered feed horn 230, the third tapered feed horn 234, and the fourth tapered feed horn 238) has a base width equal to a width of the respective feed line and an end width equal to about six times the base width. Each tapered feed horn is located directly beneath the respective pentagonal loop slot line. In an example, a width of the opening of each tapered feed horn (the first tapered feed horn 226, the second tapered feed horn 230, the third tapered feed horn 234, and the fourth tapered feed horn 238) is 7.7 mm. In an example, a length of each feedline (the first feedline 228, the second feedline 232, the third feedline 236, and the fourth feedline 240) is 15 mm. In an example, a width of each feedline (the first feedline 228, the second feedline 232, the third feedline 236, and the fourth feedline 240) is 1.8 mm.

The first adjustable voltage source 242 is connected to the first varactor diode 224 of the first pentagonal loop slot line 220. A change in a voltage of the first adjustable voltage source 242 is configured to tune a resonant frequency of the first pentagonal loop slot line 220 of the MIMO antenna 200.

The MIMO antenna 200 includes a first biasing circuit 246 and a second biasing circuit 248. The first biasing circuit 246 is located on the bottom side 206. The first biasing circuit 246 is connected, by a first metallic shorting post 245, between the first adjustable voltage source 242 and the first varactor diode 224. The first biasing circuit 246 includes a first resistor $R_1$ in series with a first inductor $L_1$.

In an operative aspect, a frequency in the range of 300 MHz to 450 MHz is selected. The first varactor diode 224 of the first pentagonal loop slot line 220 is biased by applying the voltage by the first adjustable voltage source 242. The first adjustable voltage source 242 applies the voltage to a first end of a first microstrip wire 247 located on the bottom side 206. A second end of the first microstrip wire 247 is connected to the first metallic shorting post 245. The first metallic shorting post 245 is configured to extend through the dielectric circuit board 202 and connect to the reverse biased varactor diode 224 on the top side 204. The first resistor $R_1$ and the first inductor $L_1$ are connected in series on the first microstrip wire 247. A frequency of the first adjustable voltage source 242 is configured to be swept until the MIMO antenna 200 resonates at the selected frequency.

The second adjustable voltage source 244 is connected to the second varactor diode 225 of the second pentagonal loop slot line 222. A change in the voltage of the second adjustable voltage source 244 is configured to tune a resonant frequency of the second pentagonal loop slot line 222 of the MIMO antenna 200.

The second biasing circuit 248 is located on the bottom side 206. The second biasing circuit 248 is connected by a second metallic shorting post 250 between the second adjustable voltage source 244 and the second varactor diode 225. The second biasing circuit 248 includes a second resistor $R_2$ in series with a second inductor $L_2$.

The second varactor diode 225 of the second pentagonal loop slot line 222 is biased by applying the voltage by the second adjustable voltage source 244. The second adjustable voltage source 244 applies the voltage to a first end of a second microstrip wire 249 located on the bottom side 206. A second end of the second microstrip wire 249 is connected to a second metallic shorting post 250. The second metallic shorting post 250 is configured to extend through the dielectric circuit board 202 and connect to the second varactor diode 225 of the second pentagonal loop slot line 222 on the top side 204. The second resistor $R_2$ and the second inductor $L_2$ are connected in series on the second microstrip wire 249. A frequency of the second adjustable voltage source 244 is configured to be swept until the MIMO antenna 200 resonates at a selected frequency.

In the present MIMO antenna 200, the biasing circuits and the antenna elements (the first pentagonal loop slot line 220 and the second pentagonal loop slot line 222) are well isolated and have a tuning effect on the antenna's performance.

FIG. 2C is a top view of a fabricated MIMO antenna 200. FIG. 2D is a bottom view of the fabricated MIMO antenna 200. In an example, the MIMO antenna 200 was fabricated using a laser milling machine.

The following examples are provided to illustrate further and to facilitate the understanding of the present disclosure.

During experimentation, the MIMO antenna 200 was stimulated using a HFSS (High Frequency Structure Simulator). Ports 1-4 were each configured with a coax connector for connection with the input signal source. The fabricated MIMO antenna 200 was characterized for S-parameters using vector network analyzer (for example, Agilent Field-Fox RF Vector Network Analyzer manufactured by Agilent Technologies, Inc., located at 5301 Stevens Creek Blvd. Santa Clara, CA, USA).

The fabricated MIMO antenna 200 was developed, evaluated and analyzed using an Ansys Electromagnetics Suite. The Ansys Electromagnetics Suite (Ansys Electronics Desktop (AEDT) developed by Ansys, Inc., Southpointe 2600 Ansys Drive Canonsburg, PA 15317 USA) is a platform that enables electronic system design. AEDT provides access to the industry Ansys simulators for work with antenna, RF, microwave, PCB, integrated circuit (IC) and IC package designs, along with electromechanical devices such as electric motors and generators. The parameters of the folded slot elements, feed structure, and the capacitance values were carefully tuned to achieve the compact MIMO antenna 200 to cover 578 MHZ-929 MHz frequency band. The frequency band of the MIMO antenna 200 may be controlled to shift further towards lower frequencies or towards higher frequencies by adjusting only the capacitance value of the varactor diode (varactor diode is a type of diode whose internal capacitance varies with respect to the reverse voltage). Hence, the MIMO antenna 200 has the adaptability and flexibility to be used in other frequency bands.

First Experiment: simulating and measuring reflection coefficients ($S_{11}$ and $S_{22}$) of the MIMO antenna 200

During the first experiment, the antenna was simulated, and reflection coefficients ($|S_{ii}|<-10$ dB) versus frequency were measured. For example, the reflection coefficient for only two ports (port 1 and port 2) are shown, as other ports (port 3 and port 4) show a similar response to port 1 and port 2. Due to the capacitive loaded slot structure (122) fed with a tapered feed horn (126, 130), the antenna offers a very wide measured impedance bandwidth ranging from 578 MHz to 929 MHz for both port 1 and port 2.

Figure 3A:
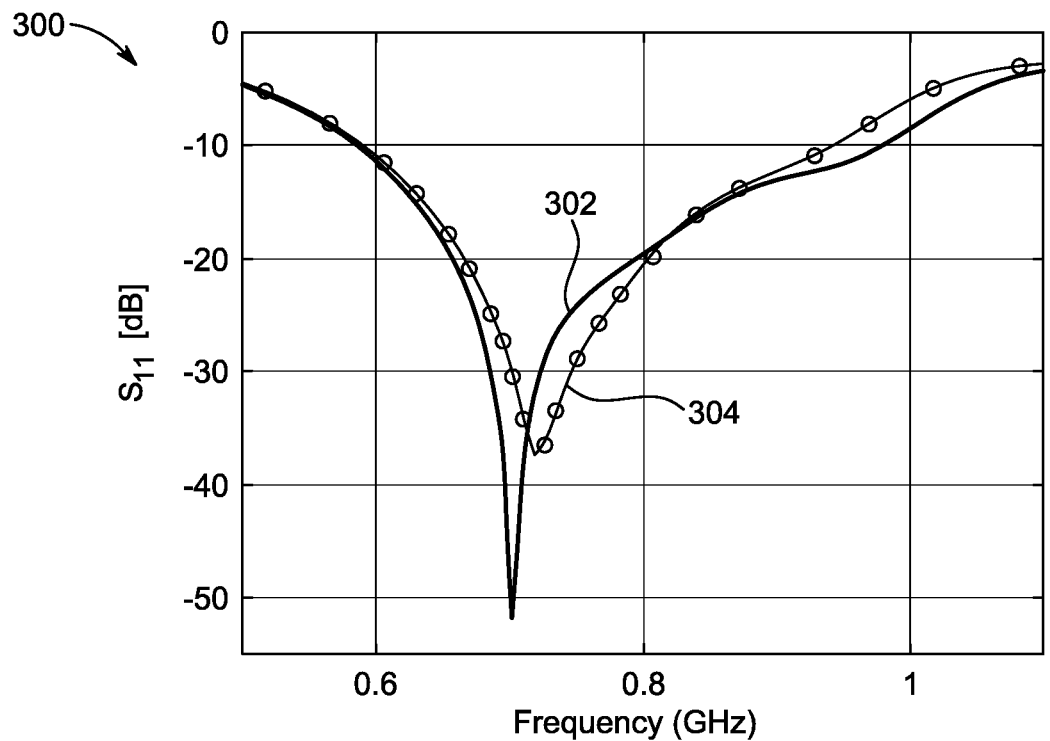
FIG. 3A is a graph of simulated and measured s-parameters ($S_{11}$) results, according to certain embodiments.

FIG. 3A is a graph 300 of simulated and measured s-parameters ($S_{11}$) results. The S-parameters describe the input-output relationship between ports (or terminals) in an electrical system. For example, if there are 2 ports (port 1 and port 2), then $S_{12}$ represents the power transferred from port 2 to port 1. $S_{21}$ represents the power transferred from port 1 to port 2. $S_{11}$ (return loss) represents how much power is reflected from the antenna, and hence is known as the reflection coefficient. If $S_{11}=0$ dB, then all the power is reflected from the antenna, and nothing is radiated. Signal 302 represents the simulated values of s-parameters ($S_{11}$). Further, signal 304 represents the measured values of $S_{11}$. The MIMO antenna 200 may be tuned to other lower frequency bands by changing the capacitance values, thereby making the MIMO antenna 200 frequency reconfigurable.

Figure 3B:
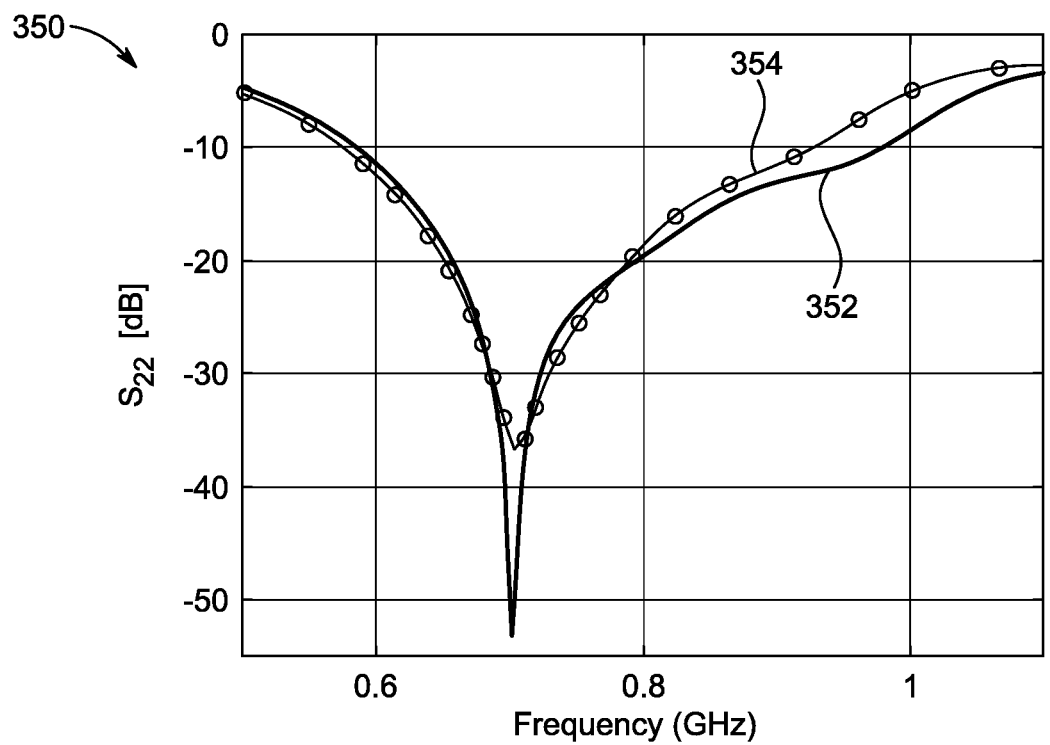
FIG. 3B is a graph of simulated and measured s-parameters ($S_{22}$) results, according to certain embodiments.

FIG. 3B is a graph 350 of simulated and measured s-parameters ($S_{22}$) results versus frequency. The S-parameter matrix can be used to determine reflection coefficients and transmission gains from both sides of a two port network. $S_{22}$ is an output port voltage reflection coefficient. Signal 352 represents the simulated values of $S_{22}$. Signal 354 represents the measured values of $S_{22}$.

Second Experiment: simulating and measuring isolation coefficients ($S_{13}$ and $S_{14}$) of the MIMO antenna 200.

Figure 4A:
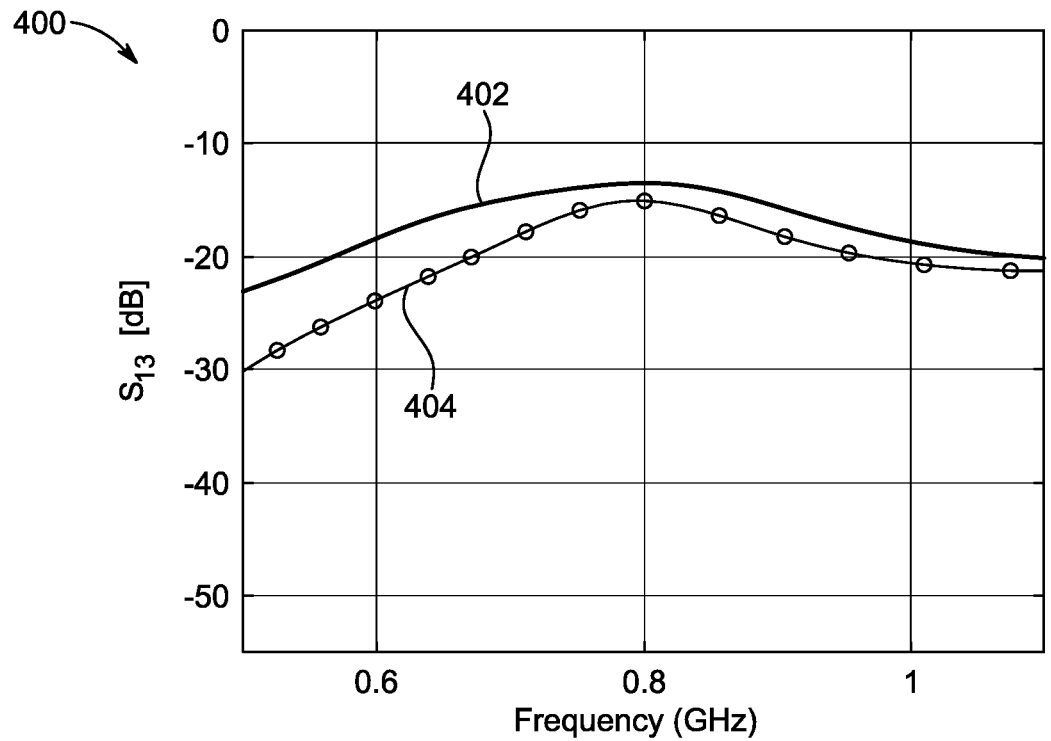
FIG. 4A is a graph of simulated and measured s-parameters ($S_{13}$) results, according to certain embodiments.
Figure 4B:
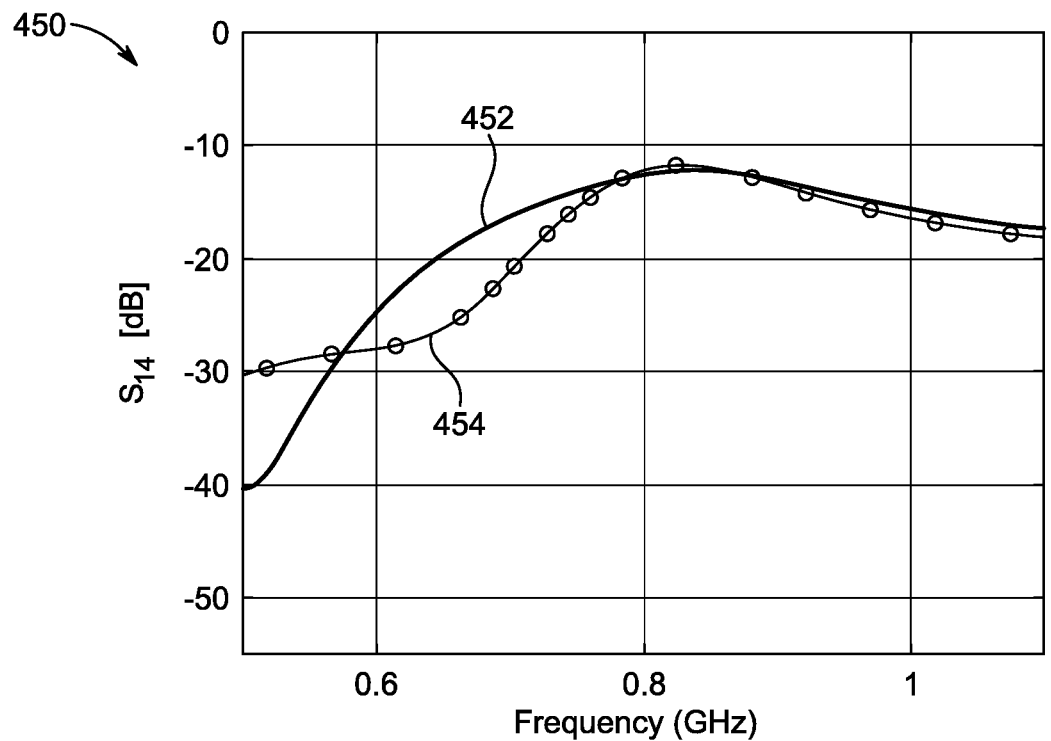
FIG. 4B is a graph of simulated and measured s-parameters ($S_{14}$) results, according to certain embodiments.

During experiments, simulated and measured isolation versus frequency among the MIMO elements were analyzed in terms of the transmission coefficients as shown in FIG. 4A-FIG. 4B. Besides the minimal edge spacing of the antenna elements, the MIMO antenna 200 has good isolation between the MIMO ports, which is found to be greater than 11.75 dB for port 1 and port 4, as shown in FIG. 4B. The isolation is more than 13.47 dB in the case of port 1 and port 3, as shown in FIG. 4A.

FIG. 4A is a graph 400 of simulated and measured s-parameters ($S_{13}$) results. Signal 402 represents the simulated values of $S_{13}$. Signal 404 represents the measured values of $S_{13}$.

FIG. 4B is a graph 450 of simulated and measured s-parameters ($S_{14}$) results. Signal 452 represents the simulated values of $S_{14}$. Signal 454 represents the measured values of $S_{14}$.

Third Experiment: simulating and measuring axial ratio (AR) of the MIMO antenna 200

Figure 5A:
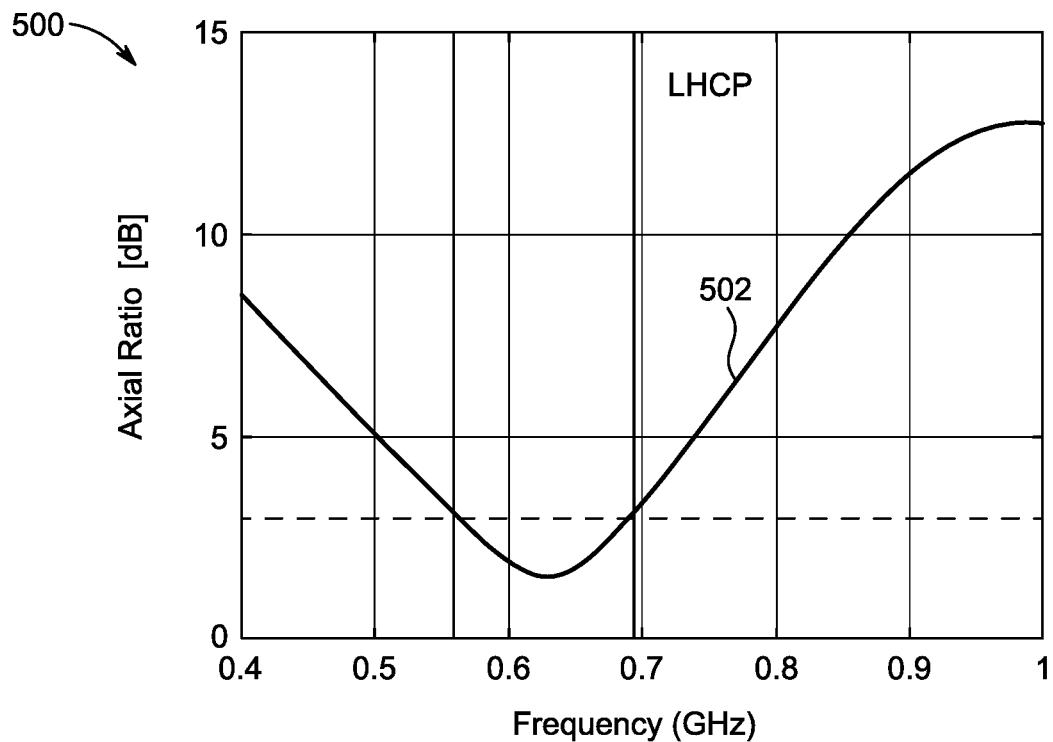
FIG. 5A is a graph of simulated and measured axial ratio (AR) results when the antenna has left handed circular polarization (LHCP), according to certain embodiments.
Figure 5B:
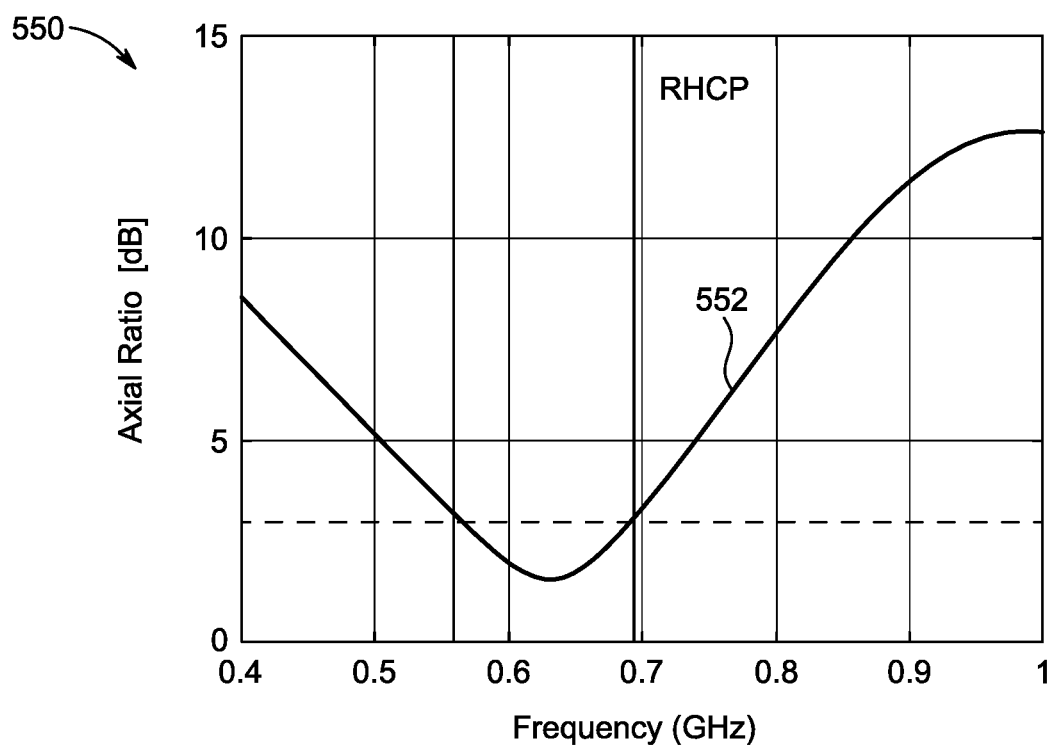
FIG. 5B is a graph of simulated and measured AR results when the antenna has right handed circular polarization (RHCP), according to certain embodiments.

The MIMO antenna 200 enables dual sensing circular polarization (LHCP and RHCP). The MIMO antenna 200 resonates with LHCP when the port 1 (left port) is excited, while the MIMO antenna 200 resonates with RHCP when the port 2 (right port) is excited. The simulated and measured AR as a function of the frequency is shown in FIG. 5A-FIG. 5B. As evident from FIG. 5A-FIG. 5B, the ports (port 1 and port 2) showed almost identical 3 dB AR bandwidth. The antenna can produce a 3-dB LHCP bandwidth of 490 MHz-810 MHz, and a RHCP bandwidth in frequency ranges from 493 MHz to 811 MHz. Linearly polarized (LP) radiation is obtained when both ports (port 1 and port 2) are fed simultaneously. The AR values increase up to 40 dB during the LP radiation. Unlike other conventional polarization bandwidth reconfigurable antennas, the MIMO antenna 200 offers LP, RHCP, and LHCP radiations without requiring any switching circuit, as required in the conventional polarization bandwidth reconfigurable antennas.

FIG. 5A is a graph 500 of AR results when the MIMO antenna 200 offers LHCP. Signal 502 represents the AR values when the first pentagonal loop slot line 220 transmits the input signal at the resonant frequency with LHCP by applying the input signal to the first feedline 228.

FIG. 5B is a graph 550 of AR results when the MIMO antenna 200 resonates with RHCP. Signal 552 represents the AR values when the first pentagonal loop slot line 220 transmits the input signal at the resonant frequency with RHCP by applying the input signal to the second feedline 232.

Figure 6:
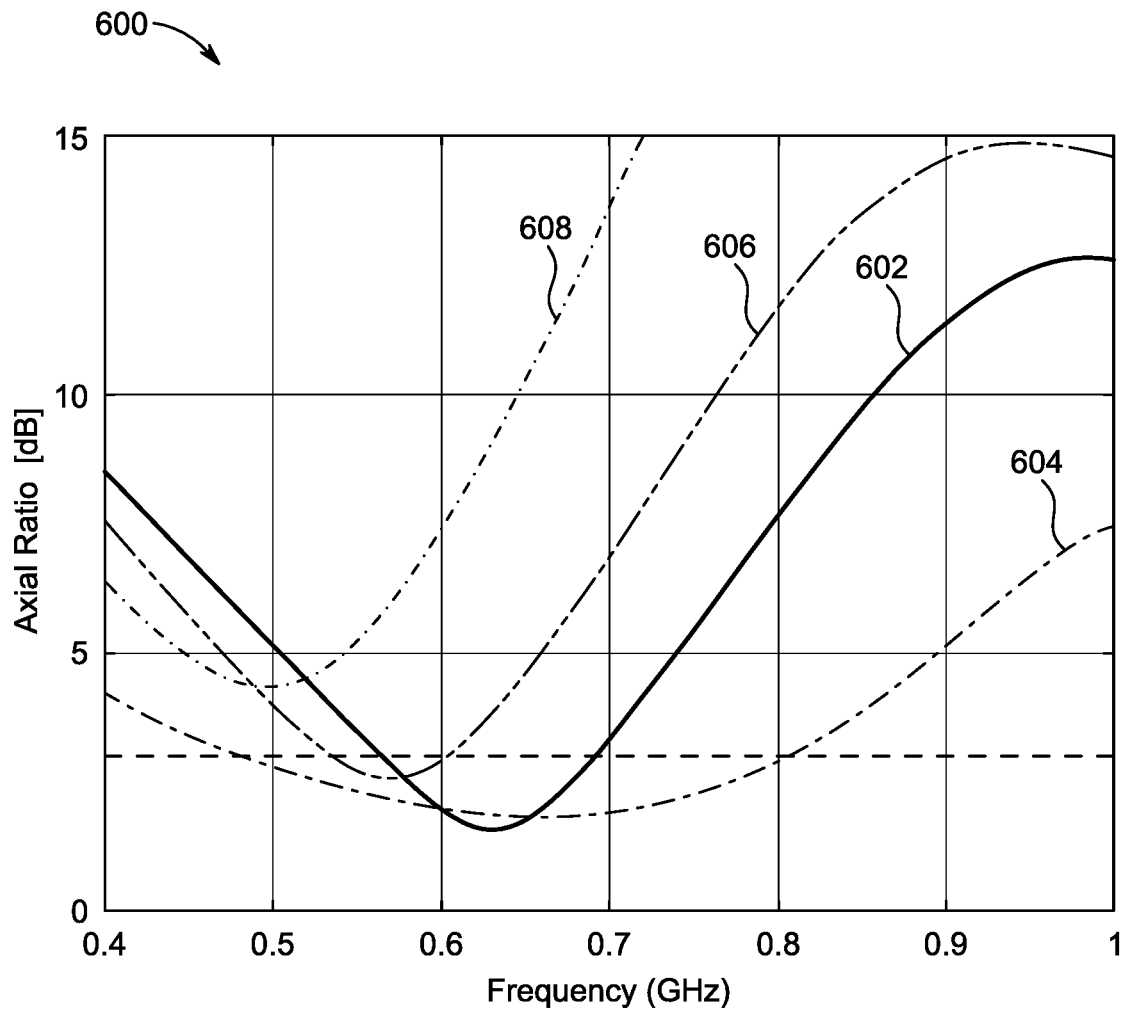
FIG. 6 is a graph of AR reconfigurability of the dual port, slot-based MIMO antenna with respect to varying values of the varactor, according to certain embodiments.

FIG. 6 is a graph 600 of AR reconfigurability of the MIMO antenna 200 with respect to frequency for varying values of the varactor diode. Signal 602 represents the resonance of the AR when the value of the varactor diode is 0.31 pF. Signal 604 represents the resonance of the AR when the value of the varactor diode is 0.38 pF. Signal 606 represents the resonance of the AR when the value of the varactor diode is 0.66 pF. Signal 608 represents the resonance of the AR when the value of the varactor diode is 1.08 pF. The central frequency of the AR can be tuned by varying the capacitance of the varactor diode. As shown in FIG. 6, by changing the capacitance of the varactor diode, the resonance of the AR can be shifted from 700 MHZ, 640 MHz, and 550 MHz for the values of 0.31 pF, 0.38 pF, 0.66 pF, and 1.08 pF, respectively.

For antenna(s) transmitting simultaneous and independent data streams, isolation is required between the antenna(s) such that each of antenna works independently without affecting other's performance. In other words, mutual inductance between the antennas should be minimized. The antennas should have good isolation, and their radiation patterns should not be same, or at least not very "correlated". To measure the isolation between the antennas, an envelope correlation coefficient (ECC) is calculated.

The ECC is a comparison of the independent radiation patterns of two antennas. For example, if one antenna is completely horizontally polarized, and the other is completely vertically polarized, then the two antennas would have a correlation of zero. In similar manner, if one antenna only radiated energy towards the sky, and the other only radiated energy towards the ground, these antennas would also have an ECC of 0. The ECC is considered as an important factor for accounting the radiation pattern shape, polarization and relative phase of the fields between the two antennas. During experiments, the values were found to be very low, less than 0.02, which is ideal for MIMO operation.

Figure 7A:
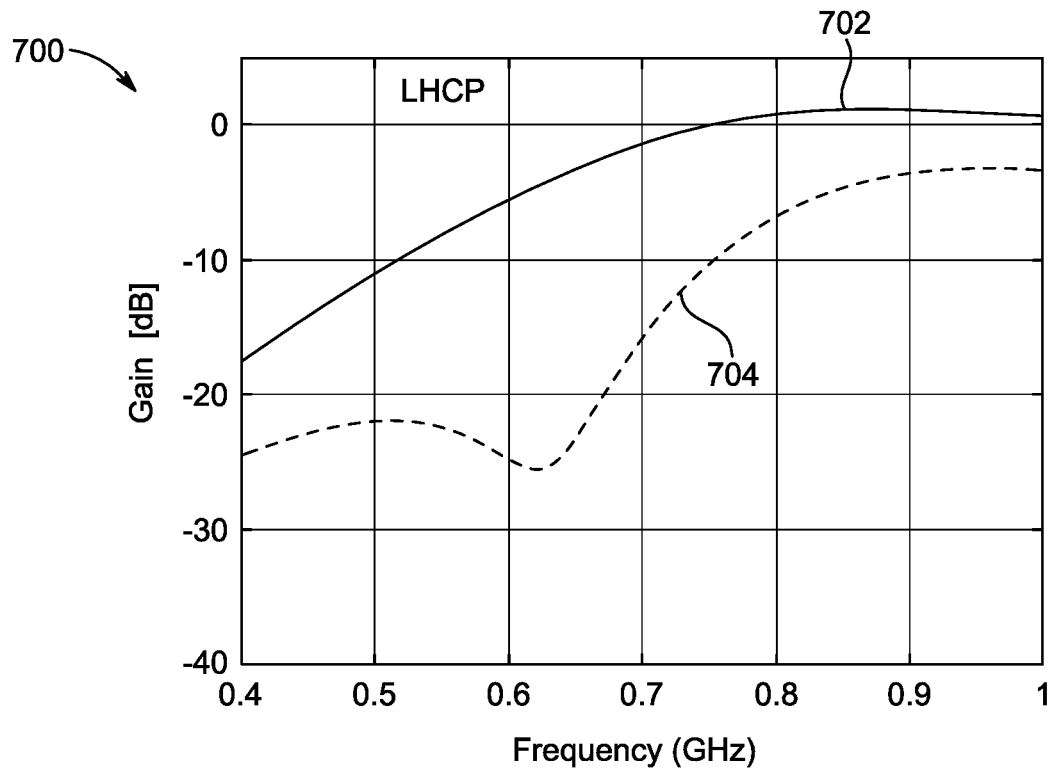
FIG. 7A is a graph of the gain of the dual port, slot-based MIMO antenna when the antenna has LHCP, according to certain embodiments.

FIG. 7A is a graph 700 of gain versus frequency of the MIMO antenna 200 when the antenna resonates with LHCP. Signal 702 represents LHCP gain of the MIMO antenna 200. Signal 704 represents RHCP gain of the MIMO antenna 200.

Figure 7B:
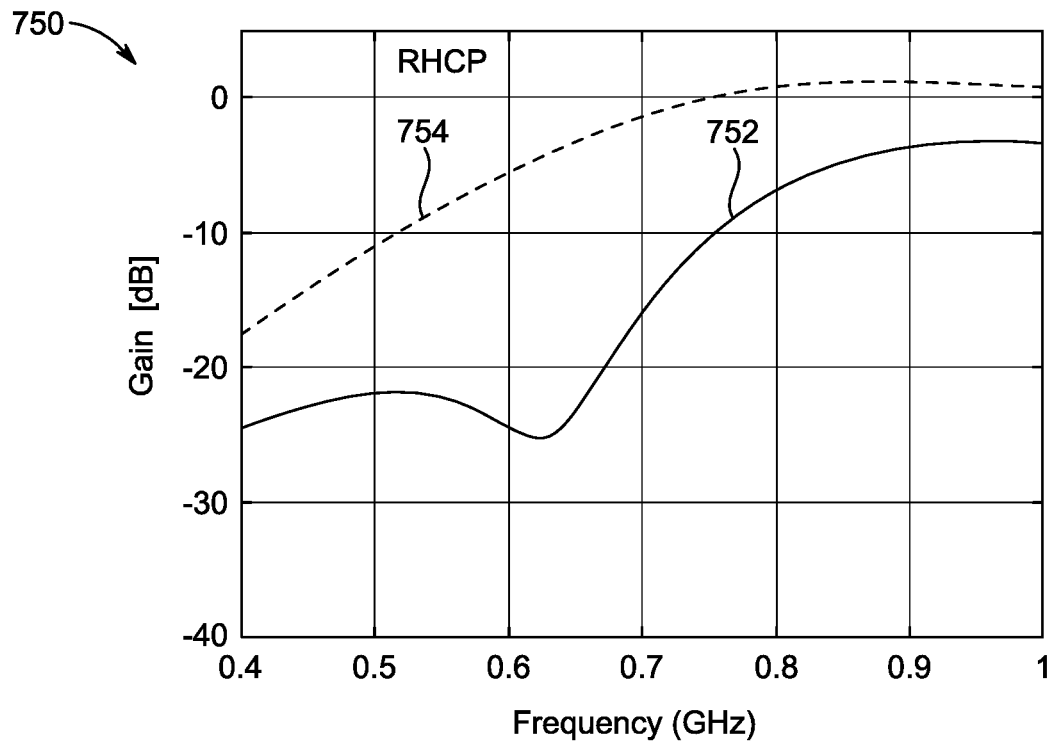
FIG. 7B is a graph of the gain of the dual port, slot-based MIMO antenna when the antenna has RHCP, according to certain embodiments.

FIG. 7B is a graph 750 of gain versus frequency of the MIMO antenna 200 when the antenna resonates with RHCP. Signal 752 represents the LHCP gain of the MIMO antenna 200. Signal 754 represents the RHCP gain of the MIMO antenna 200.

In the present disclosure, a two-element MIMO antenna operating at sub-GHz with polarization-frequency agility is described. The primary single-element antenna includes a pentagonal slot line having the varactor diode in its center. The pentagonal slot line is fed by two folded tapered feedlines. The single-element antenna 100 is then duplicated on the dielectric circuit board in a mirror image configuration which rotated 180 degrees about the second central axis for the realization of the 4-port MIMO antenna 200. The capacitive loaded slot-line with the folded feedlines gives a broadband impedance bandwidth of 46.58% (578 MHZ-929 MHz), and a 3 dB AR bandwidth from 490 MHz-810 MHz. Additionally, the AR bandwidth can be reconfigured based on the system requirements by varying the capacitance of the varactor diode. The AR can be tuned over the operating bandwidth of 578 MHz to 929 MHz. Furthermore, the antenna 200 gives a high RHCP and LHCP gain of 1.079 dBi, and 1.078 dBi, respectively. Besides the low edge-to-edge spacing of the MIMO elements, the antenna 200 offered excellent isolation of more than 11.75 dB.

The first embodiment is illustrated with respect to FIG. 2A-FIG. 2D. The first embodiment describes a dual port, slot-based multiple-input-multiple-output (MIMO) antenna 200 for cubic shaped satellites (CubeSat). The MIMO antenna 200 includes a dielectric circuit board 202, a metallic layer 218, a first pentagonal loop slot line 220, a second pentagonal loop slot line 222, a first tapered feed horn 226, a second tapered feed horn 230, a third tapered feed horn 234, a fourth tapered feed horn 238, a first adjustable voltage source 242, and a second adjustable voltage source 244. The dielectric circuit board 202 has a surface dimension of about 100 mm in length and about 100 mm in width, a top side 204, a bottom side 206, a first edge 208 opposite a second edge 210, a third edge 212 opposite a fourth edge 214, a first central axis 216 extending from the first edge 208 to the second edge 210, and a second central axis 217 extending from the third edge 212 to the fourth edge 214. The metallic layer is configured to cover the top side 204 of the dielectric circuit board 202. The first pentagonal loop slot line 220 and the second pentagonal loop slot line 222 are etched into the metallic layer 218 on the top side 204 of the dielectric circuit board 202. The second pentagonal loop slot line 222 is a mirror image of the first pentagonal loop slot line 220 across the second central axis 217. Each pentagonal loop slot line is configured to have an apex coincident with the first central axis 216, a first leg having a first end at the apex, wherein the first leg extends from the apex towards the third edge 212 at a first angle, a second leg having a first end connected to the first leg at the apex, wherein the second leg extends from the apex towards the fourth edge 214 at an angle equal to a negative of the first angle, a third leg having a first end connected to a second end of the first leg, wherein the third leg extends parallel to the third edge 212 and towards the second central axis 217, a fourth leg having a first end connected to a second end of the second leg, wherein the fourth leg extends parallel to the fourth edge 214 and towards the second central axis 217, a fifth leg which extends between a second end of the third leg and a second end of the fourth leg, the fifth leg configured with a gap, wherein the gap is bisected by the first central axis; and a varactor diode connected across the gap to the metallic layer on either side of the gap. The first tapered feed horn 226 is located on the bottom side 206. The first tapered feed horn 226 is connected to a first feedline 228 which extends from the third edge 212 towards the first central axis 216. An opening of the first tapered feed horn 226 extends towards the gap in the fifth leg of the first pentagonal loop slot line 220. The second tapered feed horn 230 is located on the bottom side 206. The second tapered feed horn 230 is connected to a second feedline 232 which extends from the fourth edge 214 towards the first central axis 216. An opening of the second tapered feed horn 230 extends towards the gap in the fifth leg of the first pentagonal loop slot line 220. The third tapered feed horn 234 is located on the bottom side 206. The third tapered feed horn 234 is connected to a third feedline 236 which extends from the third edge 212 towards the first central axis 216. An opening of the third tapered feed horn 234 extends towards the gap in the fifth leg of the second pentagonal loop slot line 222. The fourth tapered feed horn 238 is located on bottom side 206. The fourth tapered feed horn 238 is connected to a fourth feedline which extends from the fourth edge 214 towards the first central axis 216. An opening of the fourth tapered feed horn 238 extends towards the gap in the fifth leg of the second pentagonal loop slot line 222. The first adjustable voltage source 242 is connected to the varactor diode of the first pentagonal loop slot line 220. A change in a voltage of the first adjustable voltage source 242 is configured to tune a resonant frequency of the first pentagonal loop slot line 220 of the MIMO antenna 200. The second adjustable voltage source 244 is connected to the varactor diode of the second pentagonal loop slot line 222. A change in a voltage of the second adjustable voltage source 244 is configured to tune a resonant frequency of the second pentagonal loop slot line 222 of the MIMO antenna. The MIMO antenna is configured to resonate with circular polarization at a resonant frequency in an ultra-high frequency sub-GHz range of about 578 MHZ to about 929 MHz when an input signal is applied to each feedline.

In an aspect, the dual port, slot-based MIMO antenna includes a first biasing circuit and a second biasing circuit. The first biasing circuit is located on the bottom side 206 and connected by a first metallic shorting post between the first adjustable voltage source 242 and the first varactor diode. The first biasing circuit includes a first resistor in series with a first inductor. The second biasing circuit is located on the bottom side 206 and connected by a second metallic shorting post between the second adjustable voltage source 244 and the second varactor diode 225. The second biasing circuit includes a second resistor in series with a second inductor.

In an aspect, the first pentagonal loop slot line 220 is configured to resonate with left hand circular polarization when the input signal is applied to the first feedline 228.

In an aspect, the first pentagonal loop slot line 220 is configured to resonate with right hand circular polarization when the input signal is applied to the second feedline 232.

In an aspect, the second pentagonal loop slot line 222 is configured to resonate with left hand circular polarization when the input signal is applied to the third feedline 236.

In an aspect, the second pentagonal loop slot line 222 is configured to resonate with right hand circular polarization when the input signal is applied to the fourth feedline 240.

In an aspect, each pentagonal loop slot line has constant width.

In an aspect, the constant width is about 3 mm.

In an aspect, each tapered feed horn has a base width equal to a width of the respective feed line and an end width equal to about six times the base width, wherein each tapered feed horn is located directly beneath the respective pentagonal loop slot line.

In an aspect, the fifth leg of the first pentagonal loop slot line 220 and the fifth leg of the second pentagonal loop slot line 222 are separated along the first central axis 216 by a separation distance configured to isolate the first pentagonal loop slot line 220 from the second pentagonal loop slot line 222.

In an aspect, the separation distance is about 25 mm.

The second embodiment is illustrated with respect to FIG. 1A-FIG. 2D. The second embodiment describes a method for transmitting ultra-high frequency (UHF) signals with a dual port, slot-based multiple-input-multiple-output (MIMO) antenna. The method includes connecting an input signal to a plurality of feedlines located on the dual port, slot-based MIMO antenna. The dual port, slot-based MIMO antenna includes a dielectric circuit board, a metallic layer, a first pentagonal loop slot line 220, a second pentagonal loop slot line 222, a first tapered feed horn 226, a second tapered feed horn 230, a third tapered feed horn 234, a fourth tapered feed horn 238, a first adjustable voltage source 242, and a second adjustable voltage source 244. The dielectric circuit board has a surface dimension of about 100 mm in length and about 100 mm in width, a top side 204, a bottom side 206, a first edge 208 opposite a second edge 210, a third edge 212 opposite a fourth edge 214, a first central axis 216 extending from the first edge 208 to the second edge 210, and a second central axis 217 extending from the third edge 212 to the fourth edge 214. The metallic layer is configured to cover the top side 204 of the dielectric circuit board. The first pentagonal loop slot line 220 and the second pentagonal loop slot line 222 are etched into the metallic layer on the top side 204 of the dielectric circuit board. The second pentagonal loop slot line 222 is a mirror image of the first pentagonal loop slot line 220 across the second central axis 217. Each pentagonal loop slot line is configured to have: an apex coincident with the first central axis 216; a first leg having a first end at the apex, wherein the first leg extends from the apex towards the third edge 212 at a first angle; a second leg having a first end connected to the first leg at the apex, wherein the second leg extends from the apex towards the fourth edge 214 at an angle equal to a negative of the first angle; a third leg having a first end connected to a second end of the first leg, wherein the third leg extends parallel to the third edge 212 and towards the second central axis 217;

a fourth leg having a first end connected to a second end of the second leg, wherein the fourth leg extends parallel to the fourth edge 214 and towards the second central axis 217; a fifth leg which extends between a second end of the third leg and a second end of the fourth leg, the fifth leg configured with a gap, wherein the gap is bisected by the central axis; and a varactor diode connected across the gap to the metallic layer on either side of the gap. The first tapered feed horn 226 is located on the bottom side 206. The first tapered feed horn 226 is connected to a first feedline 228 of the plurality of feedlines. The first feedline 228 extends from the third edge 212 towards the first central axis 216. An opening of the first tapered feed horn 226 extends towards the gap in the fifth leg of the first pentagonal loop slot line 220. The second tapered feed horn 230 is located on the bottom side 206. The second tapered feed horn 230 is connected to a second feedline 232 of the plurality of feedlines. The second feedline 232 extends from the fourth edge 214 towards the first central axis 216. An opening of the second tapered feed horn 230 extends towards the gap in the fifth leg of the first pentagonal loop slot line 220. The third tapered feed horn 234 located on the bottom side 206. The third tapered feed horn 234 is connected to a third feedline 236 of the plurality of feedlines. The third feedline 236 extends from the third edge 212 towards the first central axis 216. An opening of the third tapered feed horn 234 extends towards the gap in the fifth leg of the second pentagonal loop slot line 222. The fourth tapered feed horn 238 located on bottom side 206, wherein the fourth tapered feed horn 238 is connected to a fourth feedline of the plurality of feedlines. The fourth feedline extends from the fourth edge 214 towards the first central axis 216. An opening of the fourth tapered feed horn 238 extends towards the gap in the fifth leg of the second pentagonal loop slot line 222. The first adjustable voltage source 242 is connected to the varactor diode of the first pentagonal loop slot line 220. The second adjustable voltage source 244 connected to the varactor diode of the second pentagonal loop slot line 222. The method includes adjusting a voltage of the first adjustable voltage source 242 to tune a resonant frequency of the first pentagonal loop slot line 220 of the dual feed single element antenna. The method includes adjusting a voltage of the second adjustable voltage source 244 to tune a resonant frequency of the second pentagonal loop slot line 222 of the dual feed single element antenna. The method includes biasing, with a biasing circuit, the varactor diode to cause the dual port MIMO antenna to transmit the input signal with circular polarization at a resonant frequency in an ultra-high frequency sub-GHz range of about 578 MHz to about 929 MHz.

In an aspect, the method further includes biasing the varactor diode of the first pentagonal slot line by applying a voltage, by the first adjustable voltage source 242, to a first end of a first microstrip wire located on the bottom side 206, wherein a second end of the first microstrip wire is connected to a first metallic shorting post, wherein the first metallic shorting post is configured to extend through the dielectric circuit board and connect to the reverse biased varactor diode on the top side 204, and wherein a first inductor and a first resistor are connected in series on the microstrip wire. The method further includes adjusting the first adjustable voltage source 242 until the dual port, slot-based MIMO antenna resonates in the ultra-high frequency sub-GHz range of about 578 MHz to about 929 MHz.

In an aspect, the method further includes biasing the varactor diode of the second pentagonal loop slot line by applying a voltage, by the second adjustable voltage source 244, to a first end of a second microstrip wire located on the bottom side 206, wherein a second end of the second microstrip wire is connected to a second metallic shorting post, wherein the second metallic shorting post is configured to extend through the dielectric circuit board and connect to the varactor diode of the second pentagonal loop slot line on the top side 204, and wherein a second inductor and a second resistor are connected in series on the second microstrip wire. The method further includes adjusting the second adjustable voltage source until the dual port, slot-based MIMO antenna resonates in the ultra-high frequency sub-GHz range of about 578 MHz to about 929 MHz.

In an aspect, the method further includes grounding the metallic layer on the top side 204 by connecting the metallic layer to a first end of a third metallic shorting post, wherein the third metallic shorting post is configured to extend from the bottom side 206 of the dielectric circuit board to the top side 204. The method further includes connecting a third resistor located on the bottom side 206 in series with a second end of the third metallic shorting post. The method further includes connecting a third inductor in series with the second resistor, wherein the second inductor is connected to a ground terminal.

In an aspect, the method further includes selecting the varactor diode to have a capacitance value in the range of about 0.3 picoFarads to about 1.08 picoFarads.

In an aspect, the method further includes transmitting the input signal at the resonant frequency with left hand circular polarization from the first pentagonal slot line and the second pentagonal loop slot line by applying the input signal to the first feedline 228 and the third feedline 236. The method further includes transmitting the input signal at the resonant frequency with right hand circular polarization from the second pentagonal loop slot line and the second pentagonal loop slot line by applying the input signal to the second feedline 232 and the fourth feedline.

The third embodiment is illustrated with respect to FIG. 1A-FIG. 1B. The third embodiment describes a dual port, slot-based single element antenna 100 for cubic shaped satellites (CubeSat). The antenna 100 incudes a dielectric circuit board, a metallic layer, a pentagonal loop slot line, a first tapered feed horn 126, a second tapered feed horn 230, and an adjustable voltage source. The dielectric circuit board has a surface dimension of about 100 mm in length and about 100 mm in width, a top side 104, a bottom side 106, a first edge 108 opposite a second edge 110, a third edge 112 opposite a fourth edge 114, and a central axis extending from the first edge 108 to the second edge 110. The metallic layer is configured to cover the top side 104 of the dielectric circuit board. The pentagonal loop slot line etched into the metallic layer on the top side 104 of the dielectric circuit board, the pentagonal loop configured to have: an apex near the first edge 108 and coincident with the central axis; a first leg having a first end at the apex, wherein the first leg extends from the apex towards the third edge 112 at a first angle; a second leg having a first end connected to the first leg at the apex, wherein the second leg extends from the apex towards the fourth edge 114 at an angle equal to a negative of the first angle; a third leg having a first end connected to a second end of the first leg, wherein the third leg extends parallel to the third edge 112 and towards the second edge 110; a fourth leg having a first end connected to a second end of the second leg, wherein the fourth leg extends parallel to the fourth edge 114 and towards the second edge 110; a fifth leg which extends between a second end of the third leg and a second end of the fourth leg, the fifth leg configured with a gap, wherein the gap is bisected by the central axis; and a varactor diode connected across the gap to the metallic layer on either side of the gap. The first tapered feed horn 126 located on the bottom side 106, wherein the first tapered feed horn 126 is connected to a first feedline 128 which extends from the third edge 112 towards the first central axis 116, wherein an opening of the first tapered feed horn 126 extends towards the gap in the fifth leg. The second tapered feed horn 130 located on the bottom side 106, wherein the second tapered feed horn 130 is connected to a second feedline 132 which extends from the fourth edge 114 towards the first central axis 116, wherein an opening of the second tapered feed horn 130 extends towards the gap in the fifth leg. The adjustable voltage source connected to the varactor diode, wherein a change in a voltage of the adjustable voltage source is configured to tune a resonant frequency of the dual feed single element antenna to resonate with circular polarization at a resonant frequency in an ultra-high frequency sub-GHz range of about 578 MHz to about 929 MHz when an input signal is applied to each feed horn.

In an aspect, the dual port, slot-based single element antenna includes a biasing circuit located on the bottom side 106 and connected by a shorting post between the adjustable voltage source and the first varactor diode, wherein the biasing circuit includes a resistor in series with an inductor.

In an aspect, the pentagonal loop slot line is configured to resonate with left hand circular polarization when the input signal is applied to the first feedline 128. The pentagonal loop slot line is configured to resonate with right hand circular polarization when the input signal is applied to the second feedline.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A dual port, slot-based multiple-input-multiple-output (MIMO) antenna for cubic shaped satellites (CubeSat), comprising:
    a dielectric circuit board having a surface dimension of about 100 mm in length and about 100 mm in width, a top side, a bottom side, a first edge opposite a second edge, a third edge opposite a fourth edge, a first central axis extending from the first edge to the second edge, and a second central axis extending from the third edge to the fourth edge;
    a metallic layer configured to cover the top side of the dielectric circuit board;
    a first pentagonal loop slot line and a second pentagonal loop slot line etched into the metallic layer on the top side of the dielectric circuit board, wherein the second pentagonal loop slot line is a mirror image of the first pentagonal loop slot line across the second central axis, wherein each pentagonal loop slot line is configured to have:
        an apex coincident with the first central axis;
        a first leg having a first end at the apex, wherein the first leg extends from the apex towards the third edge at a first angle;
        a second leg having a first end connected to the first leg at the apex, wherein the second leg extends from the apex towards the fourth edge at an angle equal to a negative of the first angle;
        a third leg having a first end connected to a second end of the first leg, wherein the third leg extends parallel to the third edge and towards the second central axis;
        a fourth leg having a first end connected to a second end of the second leg, wherein the fourth leg extends parallel to the fourth edge and towards the second central axis;
        a fifth leg which extends between a second end of the third leg and a second end of the fourth leg, the fifth leg configured with a gap, wherein the gap is bisected by the central axis; and
        a varactor diode connected across the gap to the metallic layer on either side of the gap;
    a first tapered feed horn located on the bottom side, wherein the first tapered feed horn is connected to a first feedline which extends from the third edge towards the first central axis, wherein an opening of the first tapered feed horn extends towards the gap in the fifth leg of the first pentagonal loop slot line;
    a second tapered feed horn located on the bottom side, wherein the second tapered feed horn is connected to a second feedline which extends from the fourth edge towards the first central axis, wherein an opening of the second tapered feed horn extends towards the gap in the fifth leg of the first pentagonal loop slot line;
    a third tapered feed horn located on the bottom side, wherein the third tapered feed horn is connected to a third feedline which extends from the third edge towards the first central axis, wherein an opening of the third tapered feed horn extends towards the gap in the fifth leg of the second pentagonal loop slot line;
    a fourth tapered feed horn located on bottom side, wherein the fourth tapered feed horn is connected to a fourth feedline which extends from the fourth edge towards the first central axis, wherein an opening of the fourth tapered feed horn extends towards the gap in the fifth leg of the second pentagonal loop slot line;
    a first adjustable voltage source connected to the varactor diode of the first pentagonal loop slot line, wherein a change in a voltage of the first adjustable voltage source is configured to tune a resonant frequency of the first pentagonal loop slot line of the dual port, slot-based MIMO antenna; and
    a second adjustable voltage source connected to the varactor diode of the second pentagonal loop slot line, wherein a change in a voltage of the second adjustable voltage source is configured to tune a resonant frequency of the second pentagonal loop slot line of the dual port, slot-based MIMO antenna,
    wherein the dual port, slot-based MIMO antenna is configured to resonate with circular polarization at a resonant frequency in an ultra-high frequency sub-GHz range of about 578 MHz to about 929 MHz when an input signal is applied to each feedline.

2. The dual port, slot-based MIMO antenna of claim 1, further comprising:
    a first biasing circuit located on the bottom side and connected by a first metallic shorting post between the first adjustable voltage source and the first varactor diode, wherein the first biasing circuit comprises a first resistor in series with a first inductor; and
    a second biasing circuit located on the bottom side and connected by a second metallic shorting post between the second adjustable voltage source and the second varactor diode, wherein the second biasing circuit comprises a second resistor in series with a second inductor.

3. The dual port, slot-based MIMO antenna of claim 2, wherein:
the first pentagonal loop slot line is configured to resonate with left hand circular polarization when the input signal is applied to the first feedline.

4. The dual port, slot-based MIMO antenna of claim 2, wherein:
the first pentagonal loop slot line is configured to resonate with right hand circular polarization when the input signal is applied to the second feedline.

5. The dual port, slot-based MIMO antenna of claim 2, wherein:
the second pentagonal loop slot line is configured to resonate with left hand circular polarization when the input signal is applied to the third feedline.

6. The dual port, slot-based MIMO antenna of claim 2, wherein:
the second pentagonal loop slot line is configured to resonate with right hand circular polarization when the input signal is applied to the fourth feedline.

7. The dual port, slot-based MIMO antenna of claim 1, wherein each pentagonal loop slot line has constant width.

8. The dual port, slot-based MIMO antenna of claim 7, wherein the constant width is about 3 mm.

9. The dual port, slot-based MIMO antenna of claim 1, wherein each tapered feed horn has a base width equal to a width of the respective feed line and an end width equal to about six times the base width, wherein each tapered feed horn is located directly beneath the respective pentagonal loop slot line.

10. The dual port, slot-based MIMO antenna of claim 1, wherein the fifth leg of the first pentagonal loop slot line and the fifth leg of the second pentagonal loop slot line are separated along the first central axis by a separation distance configured to isolate the first pentagonal loop slot line from the second pentagonal loop slot line.

11. The dual port, slot-based MIMO antenna of claim 10, wherein the separation distance is about 25 mm.

12. A method for transmitting ultra-high frequency (UHF) signals with a dual port, slot-based multiple-input-multiple-output (MIMO) antenna, comprising:
connecting an input signal to a plurality of feedlines located on the dual port, slot-based MIMO antenna, wherein dual port, slot-based MIMO antenna includes:
a dielectric circuit board having a surface dimension of about 100 mm in length and about 100 mm in width, a top side, a bottom side, a first edge opposite a second edge, a third edge opposite a fourth edge, a first central axis extending from the first edge to the second edge, and a second central axis extending from the third edge to the fourth edge;
a metallic layer configured to cover the top side of the dielectric circuit board;
a first pentagonal loop slot line and a second pentagonal loop slot line etched into the metallic layer on the top side of the dielectric circuit board, wherein the second pentagonal loop slot line is a mirror image of the first pentagonal loop slot line across the second central axis, wherein each pentagonal loop slot line is configured to have:
an apex coincident with the first central axis;
a first leg having a first end at the apex, wherein the first leg extends from the apex towards the third edge at a first angle;
a second leg having a first end connected to the first leg at the apex, wherein the second leg extends from the apex towards the fourth edge at an angle equal to a negative of the first angle;
a third leg having a first end connected to a second end of the first leg, wherein the third leg extends parallel to the third edge and towards the second central axis;
a fourth leg having a first end connected to a second end of the second leg, wherein the fourth leg extends parallel to the fourth edge and towards the second central axis;
a fifth leg which extends between a second end of the third leg and a second end of the fourth leg, the fifth leg configured with a gap, wherein the gap is bisected by the first central axis;
a varactor diode connected across the gap to the metallic layer on either side of the gap;
a first tapered feed horn located on the bottom side, wherein the first tapered feed horn is connected to a first feedline of the plurality of feedlines, wherein the first feedline extends from the third edge towards the first central axis, wherein an opening of the first tapered feed horn extends towards the gap in the fifth leg of the first pentagonal loop slot line;
a second tapered feed horn located on the bottom side, wherein the second tapered feed horn is connected to a second feedline of the plurality of feedlines, wherein the second feedline extends from the fourth edge towards the first central axis, wherein an opening of the second tapered feed horn extends towards the gap in the fifth leg of the first pentagonal loop slot line;
a third tapered feed horn located on the bottom side, wherein the third tapered feed horn is connected to a third feedline of the plurality of feedlines, wherein the third feedline extends from the third edge towards the first central axis, wherein an opening of the third tapered feed horn extends towards the gap in the fifth leg of the second pentagonal loop slot line;
a fourth tapered feed horn located on bottom side, wherein the fourth tapered feed horn is connected to a fourth feedline of the plurality of feedlines, wherein the fourth feedline extends from the fourth edge towards the first central axis, wherein an opening of the fourth tapered feed horn extends towards the gap in the fifth leg of the second pentagonal loop slot line;
a first adjustable voltage source connected to the varactor diode of the first pentagonal loop slot line;
a second adjustable voltage source connected to the varactor diode of the second pentagonal loop slot line;
adjusting a voltage of the first adjustable voltage source to tune a resonant frequency of the first pentagonal loop slot line of the dual feed single element antenna;
adjusting a voltage of the second adjustable voltage source to tune a resonant frequency of the second pentagonal loop slot line of the dual feed single element antenna; and
biasing, with a biasing circuit, the varactor diode to cause the dual port MIMO antenna to transmit the input signal with circular polarization at a resonant frequency in an ultra-high frequency sub-GHz range of about 578 MHz to about 929 MHz.

13. The method of claim 12, further comprising:
biasing the varactor diode of the first pentagonal slot line by applying a voltage, by the first adjustable voltage source, to a first end of a first microstrip wire located on the bottom side, wherein a second end of the first microstrip wire is connected to a first metallic shorting post, wherein the first metallic shorting post is configured to extend through the dielectric circuit board and connect to the reverse biased varactor diode on the top side, and wherein a first inductor and a first resistor are connected in series on the first microstrip wire; and adjusting the first adjustable voltage source until the dual port, slot-based MIMO antenna resonates in the ultra-high frequency sub-GHz range of about 578 MHz to about 929 MHz.

14. The method of claim 13, further comprising:

biasing the varactor diode of the second pentagonal loop slot line by applying a voltage, by the second adjustable voltage source, to a first end of a second microstrip wire located on the bottom side, wherein a second end of the second microstrip wire is connected to a second metallic shorting post, wherein the second metallic shorting post is configured to extend through the dielectric circuit board and connect to the varactor diode of the second pentagonal loop slot line on the top side, and wherein a second inductor and a second resistor are connected in series on the second microstrip wire; and adjusting the second adjustable voltage source until the dual port, slot-based MIMO antenna resonates in the ultra-high frequency sub-GHz range of about 578 MHz to about 929 MHz.

15. The method of claim 12, further comprising:

grounding the metallic layer on the top side by connecting the metallic layer to a first end of a third metallic shorting post, wherein the third metallic shorting post is configured to extend from the bottom side of the dielectric circuit board to the top side;

connecting a third resistor located on the bottom side in series with a second end of the third metallic shorting post; and connecting a third inductor in series with the third resistor, wherein the third inductor is connected to a ground terminal.

16. The method of claim 12, further comprising:

selecting the varactor diode to have a capacitance value in the range of about 0.3 picoFarads to about 1.08 picoFarads.

17. The method of claim 12, further comprising:

transmitting the input signal at the resonant frequency with left hand circular polarization from the first pentagonal loop slot line and the second pentagonal loop slot line by applying the input signal to the first feedline and the third feedline; and transmitting the input signal at the resonant frequency with right hand circular polarization from the second pentagonal loop slot line and the second pentagonal loop slot line by applying the input signal to the second feedline and the fourth feedline.

18. A dual port, slot-based single element antenna for cubic shaped satellites (CubeSat), comprising:

a dielectric circuit board having a surface dimension of about 100 mm in length and about 100 mm in width, a top side, a bottom side, a first edge opposite a second edge, a third edge opposite a fourth edge, and a central axis extending from the first edge to the second edge;

a metallic layer configured to cover the top side of the dielectric circuit board;

a pentagonal loop slot line etched into the metallic layer on the top side of the dielectric circuit board, the pentagonal loop configured to have:

an apex near the first edge and coincident with the central axis;

a first leg having a first end at the apex, wherein the first leg extends from the apex towards the third edge at a first angle;

a second leg having a first end connected to the first leg at the apex, wherein the second leg extends from the apex towards the fourth edge at an angle equal to a negative of the first angle;

a third leg having a first end connected to a second end of the first leg, wherein the third leg extends parallel to the third edge and towards the second edge;

a fourth leg having a first end connected to a second end of the second leg, wherein the fourth leg extends parallel to the fourth edge and towards the second edge;

a fifth leg which extends between a second end of the third leg and a second end of the fourth leg, the fifth leg configured with a gap, wherein the gap is bisected by the central axis; and a varactor diode connected across the gap to the metallic layer on either side of the gap;

a first tapered feed horn located on the bottom side, wherein the first tapered feed horn is connected to a first feedline which extends from the third edge towards the first central axis, wherein an opening of the first tapered feed horn extends towards the gap in the fifth leg;

a second tapered feed horn located on the bottom side, wherein the second tapered feed horn is connected to a second feedline which extends from the fourth edge towards the central axis, wherein an opening of the second tapered feed horn extends towards the gap in the fifth leg; and an adjustable voltage source connected to the varactor diode, wherein a change in a voltage of the adjustable voltage source is configured to tune a resonant frequency of the dual feed single element antenna to resonate with circular polarization at a resonant frequency in an ultra-high frequency sub-GHz range of about 578 MHz to about 929 MHz when an input signal is applied to each feed horn.

19. The dual port, slot-based single element antenna of claim 18, further comprising:

a biasing circuit located on the bottom side and connected by a shorting post between the adjustable voltage source and the varactor diode, wherein the biasing circuit comprises a resistor in series with an inductor.

20. The dual port, slot-based single element antenna of claim 19, wherein:

the pentagonal loop slot line is configured to resonate with left hand circular polarization when the input signal is applied to the first feedline; and the pentagonal loop slot line is configured to resonate with right hand circular polarization when the input signal is applied to the second feedline.

\* \* \* \* \*